United States Patent
Pahalawatta et al.

(10) Patent No.: US 10,531,120 B2
(45) Date of Patent: Jan. 7, 2020

(54) SYSTEMS AND METHODS FOR MULTI-LAYERED IMAGE AND VIDEO DELIVERY USING REFERENCE PROCESSING SIGNALS

(71) Applicant: Dolby Laboratories Licensing Corporation, San Francisco, CA (US)

(72) Inventors: Peshala V. Pahalawatta, Glendale, CA (US); Alexandros Tourapis, Milpitas, CA (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 346 days.

(21) Appl. No.: 15/212,117

(22) Filed: Jul. 15, 2016

(65) Prior Publication Data

US 2017/0013277 A1    Jan. 12, 2017

Related U.S. Application Data

(63) Continuation of application No. 13/808,195, filed as application No. PCT/US2011/042990 on Jul. 6, 2011, now Pat. No. 9,467,689.

(Continued)

(51) Int. Cl.
*H04N 19/597* (2014.01)
*H04N 13/139* (2018.01)
(Continued)

(52) U.S. Cl.
CPC ......... *H04N 19/597* (2014.11); *H04N 13/139* (2018.05); *H04N 13/161* (2018.05);
(Continued)

(58) Field of Classification Search
CPC ................. H04N 19/597; H04N 13/0029
See application file for complete search history.

(56) References Cited

U.S. PATENT DOCUMENTS 4,985,767 A    1/1991  Haghiri et al.
5,517,245 A *  5/1996  Kondo ................. H04N 19/587
                                                      348/392.1
(Continued)

FOREIGN PATENT DOCUMENTS

EP    1631090 A1    3/2006
EP    1720358 A2    11/2006
(Continued)

OTHER PUBLICATIONS

International Search Report dated Oct. 5, 2011 for International Application No. PCT/US2011/042990 filed in the name of Dolby Laboratories Licensing Corporation on Jul. 6, 2011. 4 pgs.

(Continued)

*Primary Examiner* — William C Vaughn, Jr.
*Assistant Examiner* — Jerry T Jean Baptiste

(57) ABSTRACT

The present disclosure describes a system and method for multi-layered image and video delivery using reference processing signal. A multi-layered encoder and a multi-layered decoder, both comprising at least one enhancement layer processor that uses reference processing and a base layer processor are provided. A multi-layered encoder and a multi-layered decoder that use reference processing and are capable of frame-compatible 3D video delivery are also described.

7 Claims, 12 Drawing Sheets

Related U.S. Application Data

(60) Provisional application No. 61/362,661, filed on Jul. 8, 2010.

(51) Int. Cl.

| | | |
|---|---|---|
| *H04N 13/161* | (2018.01) | |
| *H04N 21/2365* | (2011.01) | |
| *H04N 21/434* | (2011.01) | |
| *H04N 19/46* | (2014.01) | |
| *H04N 19/117* | (2014.01) | |
| *H04N 19/136* | (2014.01) | |
| *H04N 19/187* | (2014.01) | |
| *H04N 19/82* | (2014.01) | |
| *H04N 19/33* | (2014.01) | |
| *H04N 19/59* | (2014.01) | |
| *H04N 19/132* | (2014.01) | |
| *H04N 19/182* | (2014.01) | |
| *H04N 19/10* | (2014.01) | |
| *H04N 19/80* | (2014.01) | |
| *H04N 19/61* | (2014.01) | |

(52) U.S. Cl.
CPC ........... *H04N 19/10* (2014.11); *H04N 19/117* (2014.11); *H04N 19/132* (2014.11); *H04N 19/136* (2014.11); *H04N 19/182* (2014.11); *H04N 19/187* (2014.11); *H04N 19/33* (2014.11); *H04N 19/46* (2014.11); *H04N 19/59* (2014.11); *H04N 19/80* (2014.11); *H04N 19/82* (2014.11); *H04N 21/2365* (2013.01); *H04N 21/4347* (2013.01); *H04N 19/61* (2014.11)

(56) References Cited

U.S. PATENT DOCUMENTS

| | | | |
|---|---|---|---|
| 6,055,012 | A | 4/2000 | Haskell et al. |
| 8,363,724 | B2 | 1/2013 | Su et al. |
| 9,025,670 | B2 | 5/2015 | Tourapis et al. |
| 9,237,327 | B2 | 1/2016 | Tourapis et al. |
| 2002/0071486 | A1 | 6/2002 | Van Der Schaar et al. |
| 2004/0022318 | A1 | 2/2004 | Garrido et al. |
| 2006/0083309 | A1 | 4/2006 | Schwarz et al. |
| 2006/0133493 | A1* | 6/2006 | Cho ............ H04N 19/597 375/240.16 |
| 2006/0268991 | A1* | 11/2006 | Segall ............ H04B 1/66 375/240.24 |
| 2007/0160153 | A1 | 7/2007 | Sullivan |
| 2008/0095235 | A1* | 4/2008 | Hsiang ............ H04N 19/63 375/240.13 |
| 2008/0165850 | A1 | 7/2008 | Sagetong et al. |
| 2008/0192822 | A1 | 8/2008 | Chang et al. |
| 2008/0267291 | A1 | 10/2008 | Vieron et al. |
| 2008/0302895 | A1* | 12/2008 | Jossem ............ A47J 43/04 241/169.1 |
| 2010/0165077 | A1 | 7/2010 | Yin et al. |
| 2011/0134214 | A1* | 6/2011 | Chen ............ H04N 19/597 348/43 |
| 2012/0026288 | A1 | 2/2012 | Tourapis et al. |
| 2012/0033040 | A1 | 2/2012 | Pahalawatta et al. |
| 2012/0092452 | A1 | 4/2012 | Tourapis et al. |

FOREIGN PATENT DOCUMENTS

| | | |
|---|---|---|
| EP | 1845729 A1 | 10/2007 |
| JP | 5235035 B2 | 2/2012 |
| JP | 5406942 B2 | 7/2012 |
| WO | 2007/047736 A2 | 4/2007 |
| WO | 2008/010932 A2 | 1/2008 |
| WO | 2008/051041 A1 | 5/2008 |
| WO | 2010/011557 A2 | 1/2010 |
| WO | 2010/075346 A1 | 7/2010 |
| WO | 2010/123855 A1 | 10/2010 |
| WO | 2010/123909 A1 | 10/2010 |
| WO | 2011/005624 A1 | 1/2011 |

OTHER PUBLICATIONS

Written Opinion dated Oct. 5, 2011 for International Application No. PCT/US2011/042990 filed in the name of Dolby Laboratories Licensing Corporation on Jul. 6, 2011. 10 pgs.

International Preliminary Report on Patentability dated Aug. 9, 2012 for International Application No. PCT/US2011/042990 filed in the name of Dolby Laboratories Licensing Corporation on Jul. 6, 2011. 29 pgs.

H.264, "Advanced Video Coding for Generic Audiovisual Services" Mar. 2009. 383 pgs.

ITU-T, ISO/IEC 13818-2: Information Technology—Generic Coding of Moving Pictures and Associated Audio Information: Video. 1995. 255 pgs.

Liu, Y., et al., "H.264/SBC error resilience strategies for 3G video service" Image Analysis and Signal Processing, 2009. IASP 2009. International Conference, IEEE, Piscataway, NF, USA, Apr. 11-12, 2009, pp. 207-211. Abstract Only.

Merkle, P., et al., "Efficient Prediction Structures for Multiview Video Coding" IEEE Transactions of Circuits and Systems for Video Technology, IEEE Service Center, Piscataway, NJ, US, DOI:10.1109/TCSVT.2007.903665, vol. 17, No. 11, Nov. 1, 2007, pp. 1461-1473. Abstract Only.

Tourapis, A. et al. "A Frame Compatible System for 3D Delivery" ISO/IEC JTC! MPEG 2010, Jul. 2010, Geneva Switzerland. 9 pgs.

Wittmann, Steffen, et al., "Transmission of Post-Filter Hints for Video Coding Schemes", Image Processing, 2007. ICIP 2007. IEEE International Conference, IEEE, PI, Sep. 1, 2007, pp. 1-81-1-84. Abstract Only.

\* cited by examiner

FIG. 4

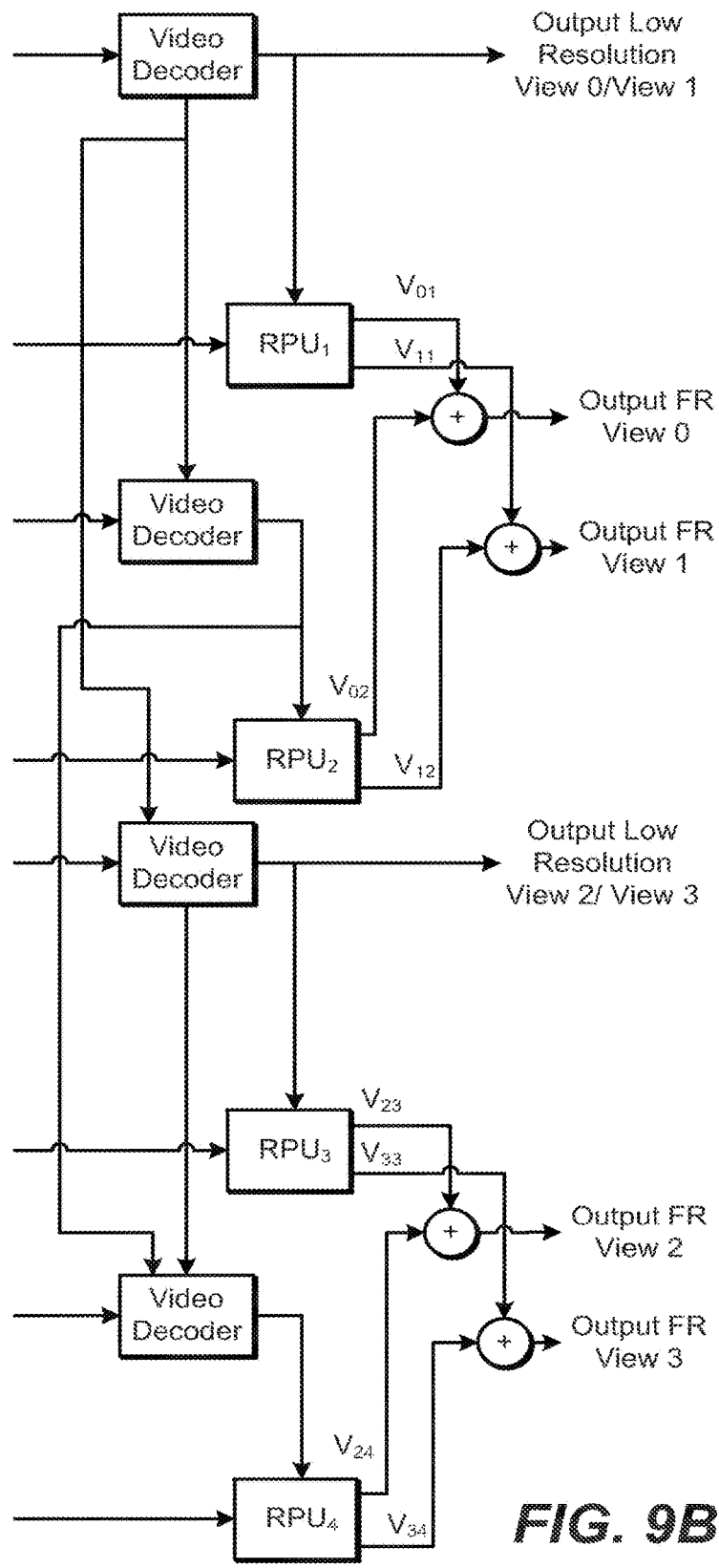
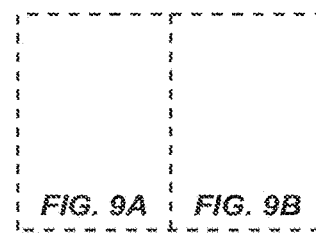
*FIG. 9*
*FIG. 9B* ns for Multi-Layered Image and Video Delivery Using Reference Processing Signals

CROSS-REFERENCE TO RELATED APPLICATIONS

The present application is a continuation of U.S. patent application Ser. No. 13/808,195, filed on Jan. 3, 2013, which is the U.S. national stage of International Patent Application PCT/US2011/042990 filed on Jul. 6, 2011, which claims priority to U.S. Patent Provisional Application No. 61/362,661, filed Jul. 8, 2010, all of which are hereby incorporated by reference in their entirety.

TECHNOLOGY

The present disclosure relates to image processing and video compression. More particularly, this disclosure relates to encoding and decoding systems and methods for multi-layered image and video delivery.

BACKGROUND

The release of a number of popular movie titles in 3D has led to a demand for avenues to deliver 3D content such as movies, sports, and other programming, to the home. In delivering 3D to the home, however, a number of constraints must be considered. One such constraint is backwards compatibility with the existing (legacy) hardware and system infrastructure. For example, a delivery solution that allows a home user to view 3D images and video using an existing set-top box, while consuming minimal additional bandwidth compared to 2D content, will be an attractive solution for most service providers.

The following cases are incorporated herein by reference: International Patent Application No. PCT/US2010/031762 filed 20 Apr. 2010 (International Publication No. WO/2010/123909 published 20 Apr. 2009); International Patent Application No. PCT/US2010/040545 filed 30 Jun. 2010 (International Publication No. WO/2011/005624 published 13 Jan. 2011); and International Patent Application No. PCT/US2010/031693 filed 20 Apr. 2010 (International Publication No. WO/US2010/123855 published 28 Oct. 2010).

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 4 shows examples of pixel replication filters in a Reference Processing Unit (RPU) for SbS frame packing, in accordance with a plurality of embodiments of the present disclosure.

in FIG. 6A view 0 uses a zero offset, view 1 uses a one pixel horizontal offset, in FIG. 6B both views use a zero offset.

DESCRIPTION OF EXAMPLE EMBODIMENTS

Figure 1:
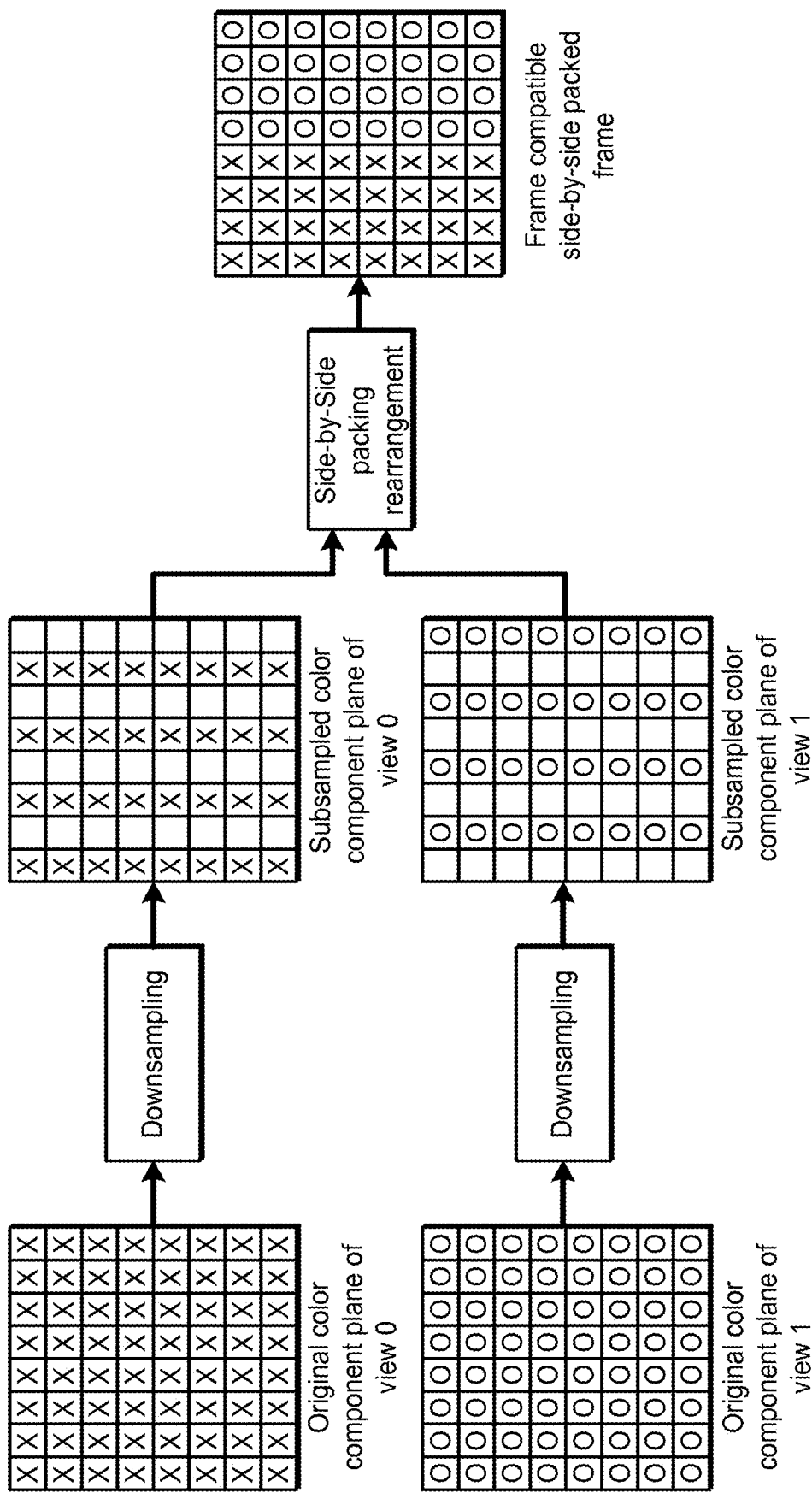
FIG. 1 shows a side-by-side (SbS) packing arrangement for frame compatible multi-view video delivery.

According to a first aspect of the present disclosure, a multi-layered encoding method for image and video delivery is provided, the multi-layered encoding method comprising base layer processing at least one input image or video frame through a base layer, said base layer processing comprising obtaining at least one first lower resolution image or video frame by processing the at least one input image or video frame and obtaining a plurality of base layer encoded bitstream signals by encoding the at least one first lower resolution image or video frame, and enhancement layer processing the at least one image or video frame through one or more enhancement layers, said enhancement layer processing comprising obtaining a first plurality of reference processing signals and at least one first reference processed image or video frame by reference processing at least one base layer signal or at least one first enhancement layer signal, according to a first set of rules, obtaining at least one residual image or video frame by processing the at least one first reference processed image or video frame and the at least one input image or video frame according to a second set of rules, obtaining at least one second lower resolution image or video frame by processing the at least one residual image or video frame, obtaining a plurality of enhancement layer encoded bitstream signals by encoding the at least one second lower resolution image or video frame, and obtaining a second plurality of reference processing signals by reference processing at least one second enhancement layer signal according to a third set of rules.

According to a second aspect of the present disclosure, a multi-layered encoder for image and video delivery is provided, the multi-layered encoder comprising a base layer processor adapted to at least one input image or video frame, said base layer processor comprising a base layer encoder adapted to output a plurality of base layer encoded bitstream signals, and at least one enhancement layer processor adapted to at least one input image or video frame, said enhancement layer processor comprising a enhancement layer encoder and at least two reference processing units (RPUs), wherein the enhancement layer encoder is adapted to output a plurality of enhancement layer encoded bitstreams, the first RPU is adapted to process at least one output from the base layer encoder or at least one enhancement layer signal and to output a first plurality of reference processing data and at least one first reference processed image or video frame according to a first set of rules, and the second RPU is adapted to process at least one output from the enhancement layer encoder and to output a second plurality of reference processing data according to a second set of rules.

According to a third aspect of the present disclosure, a multi-layered encoder using a multihypothesis process is provided, the multi-layered encoder comprising a first layer encoder, a first reference processing unit (RPU) coupled to the first layer encoder, a second layer encoder coupled to the first layer encoder, a second RPU coupled to the second layer encoder, a combiner coupled to the first RPU and the second RPU, a comparator coupled to the combiner, a third layer encoder coupled to the second layer encoder and the comparator, and a third RPU coupled to the third layer encoder wherein the combiner is adapted to generate a prediction image as an input for the third layer encoder by a weighted combination of an output of the first RPU and an output of the second RPU, the comparator is adapted to compute a residual image from the prediction image and an original view image, and the third layer encoder is adapted to encode the residual image.

According to a fourth aspect of the present disclosure, a multi-layered decoding method for image and video delivery is provided, the multi-layered decoding method comprising base layer processing a plurality of base layer encoded bitstream signals through a base layer, said base layer processing comprising obtaining at least one first low resolution image or video frame by decoding the plurality of base layer encoded bitstream signals, and enhancement layer processing a plurality of enhancement layer bitstream signals through one or more enhancement layers, wherein the plurality of enhancement layer bitstream signals comprises a plurality of enhancement layer encoded bitstream signals, a first plurality of reference processing signals, and a second plurality of reference processing signals, said enhancement layer processing comprising obtaining at least one first reference processed image or video frame by reference processing the first plurality of reference processing signals and the at least one first low resolution image or video frame, obtaining at least one enhancement layer decoded signal by decoding the plurality of enhancement layer encoded bitstream signals, and processing a base layer signal or an enhancement layer signal, obtaining at least one second reference processed image or video frame by reference processing the second plurality of reference processing signals and the at least one enhancement layer decoded signal, and obtaining at least one full resolution image or video frame by combining the at least one first reference processed image or video frame and the at least one second reference processed image or video frame.

According to a fifth aspect of the present disclosure, a multi-layered decoder for image and video delivery is provided, the multi-layered decoder comprising at least one base layer decoder adapted to decode a plurality of base layer encoded bitstream signals, at least one enhancement layer processor adapted to process a plurality of enhancement layer bitstream signals, wherein said plurality of enhancement layer bitstream signals comprises a plurality of enhancement layer encoded bitstream signals, a first plurality of reference processing signals, and a second plurality of reference processing signals, said enhancement layer processor comprising an enhancement layer decoder adapted to parse the plurality of enhancement layer bitstream signals and to decode the plurality of enhancement encoded bitstream signals, a first reference processing unit (RPU) adapted to process at an output from the base layer decoder and to output at least one first interpolated reconstructed image or video frame, according to the first plurality of reference processing signals, a second RPU adapted to process at an output from the enhancement layer decoder and to output at least one second interpolated reconstructed image or video frame, according to the second plurality of reference processing signals, and at least one combiner adapted to combine the at least one first interpolated reconstructed image or video and the at least one second interpolated reconstructed image or video frame to obtain at least one full resolution image or video frame.

According to a sixth aspect of the present disclosure, a multi-layered decoder using a multihypothesis process, the multi-layered decoder comprising a first layer decoder, a first reference processing unit (RPU) coupled to the first layer decoder, a second layer decoder coupled to the first layer decoder, a second RPU coupled to the second layer decoder, a combiner coupled to the first RPU and the second RPU, a third layer encoder coupled to the second layer encoder, a third RPU coupled to the third layer encoder, and an adder coupled to the combiner and the third RPU.

Figure 2:
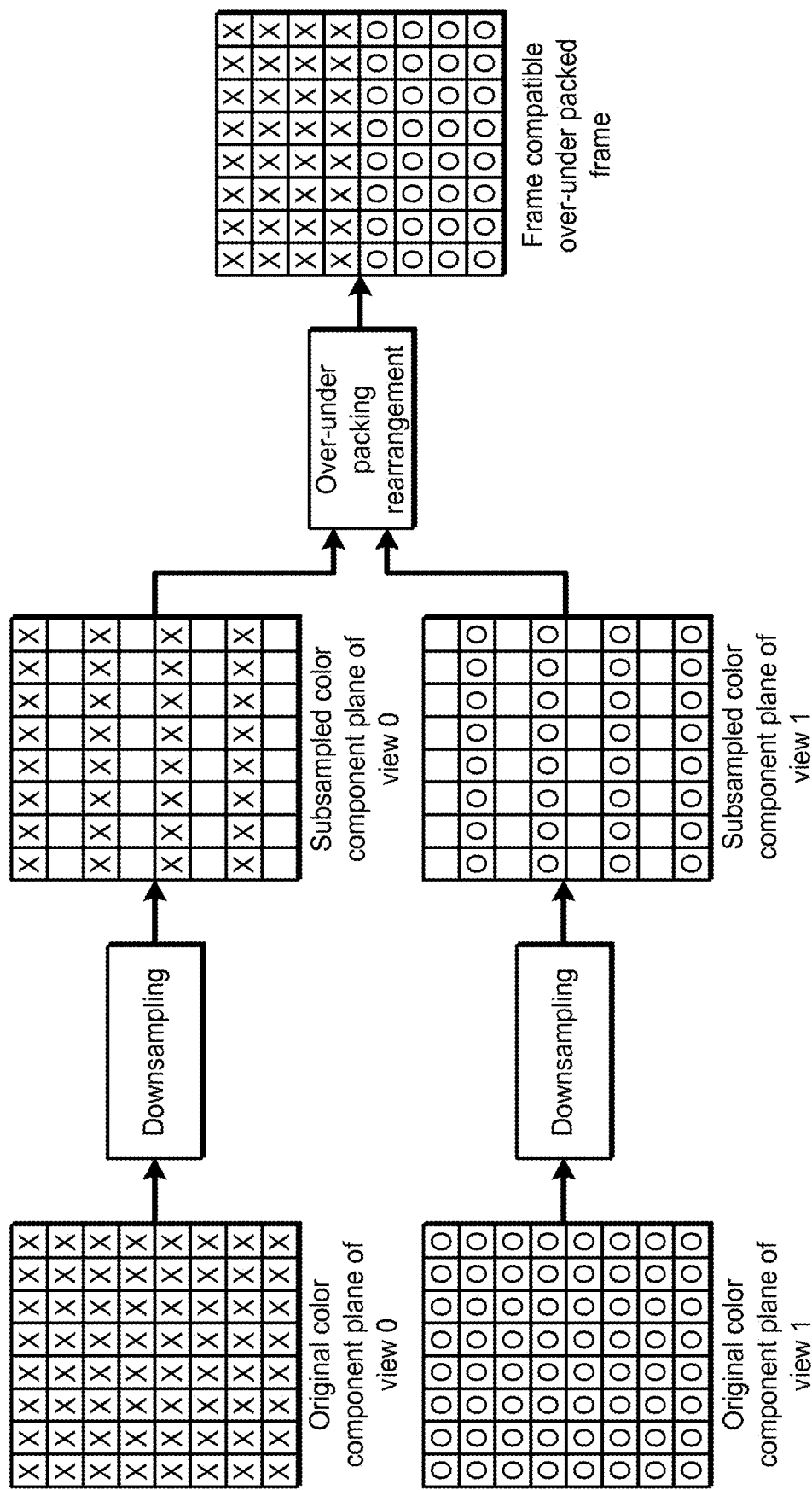
FIG. 2 depicts an Over/Under packing arrangement for frame compatible multi-view video delivery.

A backward-compatible 3D video delivery system may deliver 3D video to homes or other venues through existing or legacy 2D video hardware and systems. Frame compatible 3D video systems provide such a backwards compatible delivery architecture. See Annex B. In that case, a layered approach can be used in which the base layer provides a low resolution version of the left and right eye arranged in a "frame-compatible" format, such as Side-by-Side (SbS), Over-Under (OU), or CheckerBoard (CB). The original full resolution views may be filtered and sampled using a variety of techniques such as horizontal, vertical, quincunx sampling, etc. For example, FIG. 1 shows an SbS packing for frame compatible multi-view video delivery and FIG. 2 shows an OU packing for frame compatible multi-view video delivery.

One or more enhancement layers can be embedded in the same bitstream in a backwards compatible manner such that a future full-resolution decoder will be able to decode both views at full resolution. One such scheme for scalable 3D video delivery is proposed in Annex B.

The present disclosure proposes an extension to that scheme that can improve performance or provide alternative implementations with different characteristics, such as enabling existing decoder architectures with slight modifications to perform similar enhancements. The scheme can also be applied to obtain spatially scalable delivery of 2D images and video, and can be adapted to provide other forms of scalability such as SNR/quality, temporal, bit-depth, etc., as well as for generic multi-view video coding that may involve two or more views.

Figure 3:
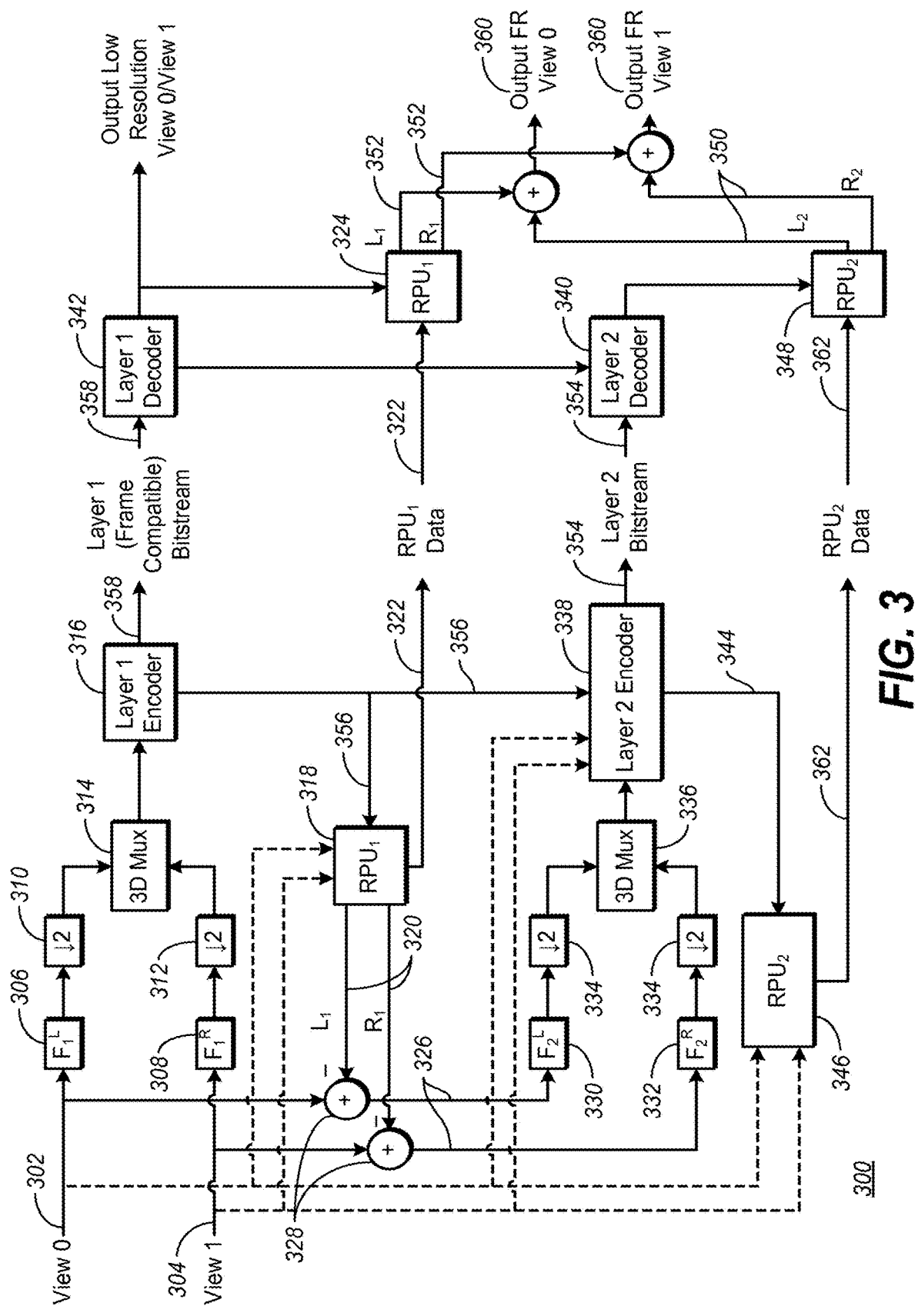
FIG. 3 depicts a block diagram of a 3D stereoscopic video delivery system, according to an embodiment of the present disclosure.

FIG. 3 provides a block diagram of a 3D stereoscopic video delivery system (300), according to an embodiment of the present disclosure. According to this embodiment, the original left (302) and right (304) eye views to be encoded are first filtered using filters $F_1^L$ (306) and $F_1^R$ (308), respectively and then subsampled using downsamplers (310, 312) to obtain the half resolution left and right eye views. According to other embodiments of the present disclosure, the filtering and sub-sampling may relate to any one of horizontal, vertical, quincunx, etc., sub-sampling schemes. Also, the downsampling filters may either be fixed for the entire sequence, or may be adapted based on the characteristics of a particular spatial and/or temporal region. For example, high textured or motion areas may use stronger filtering than low textured or motion areas. Different filtering, at an encoder or a decoder, may also be applied in the corresponding regions in opposite views to better exploit stereo masking. The filtered samples can be quantized/modulated to any appropriate precision given the requirements and pixel precision accuracy supported by the codec. A decoder also provides a dequantization/demodulation process to derive back the filtered samples before applying any processing.

According to the embodiment shown in FIG. 3, the subsampled images are then multiplexed in the 3D Mux module (314), which may perform any one of Side-by-Side, Over-Under, Line-Interleaved, Column Interleaved, Checkerboard, etc., data arrangements to form a frame compatible image sequence.

Also, in other embodiments of the present disclosure, additional "non-conventional" subsampling techniques and arrangements may be used, such as, for example, subsampling one view to a lower resolution (vertical or horizontal, or both) than the other, to provide unequal quality in one or more dimensions for different views. In one such embodiment, one view may be subsampled at higher resolution than the other view in one dimension but at lower resolution than the other in another dimension.

According to the embodiment shown in FIG. 3, the resulting frame compatible images are encoded using a video encoder (316), which may be compatible with existing video coding standards and codecs such as MPEG-2, H.264/AVC/MPEG-4 Part 10, VC1, VP6, VP7, and VP8 etc., as well as with next generation video coding standards and codecs. The codecs may support any input color and sampling format, such as YUV 4:0:0, 4:2:0, 4:2:2, and 4:4:4, RGB, XYZ or others, and can support any bit-depth precision. Different formats and/or precision could be supported between layers. In a further embodiment of the present disclosure, the output bitstream of that encoder (316) should be decodable by existing decoders that conform to the same standard. In another embodiment, the entire scheme may be treated as one codec with the bitstreams of each layer and the RPU data integrated to form a single-layered bitstream.

According to the embodiment shown in FIG. 3, the reconstructed output pictures from the encoder (316) are then fed to a Regional Processing Unit (318) ($RPU_1$) (also called a Reference Processing Unit, even though the definition Reference does not imply that this picture is explicitly used as a Reference within the complete coding process). The RPU is described in Annexes A and B. The following descriptions of the RPU apply, if not specified, both to the RPU of an encoder and that of a decoder. A person with ordinary skills in the art will understand and be capable of distinguishing between encoder-specific, decoder-specific and generic RPU descriptions, functions and processes upon reading of the present disclosure. Within the context of a frame compatible 3D coding system, such as the embodiment shown in FIG. 3, the RPU (318) obtains the low resolution decoded 3D image, and interpolates the image to obtain a prediction (320) of the original high resolution left and right eye views, according to a set of rules of selecting different RPU filters.

The RPU enables the interpolation process to be adaptive at a region level, where each region of the picture/sequence is interpolated according to the characteristics of that region. Among the possible region-dependent filters applied within the RPU can be horizontal, vertical, or 2D filters, edge adaptive or frequency based filters, as well as pixel replication filters or other methods used for interpolation.

Figure 4:
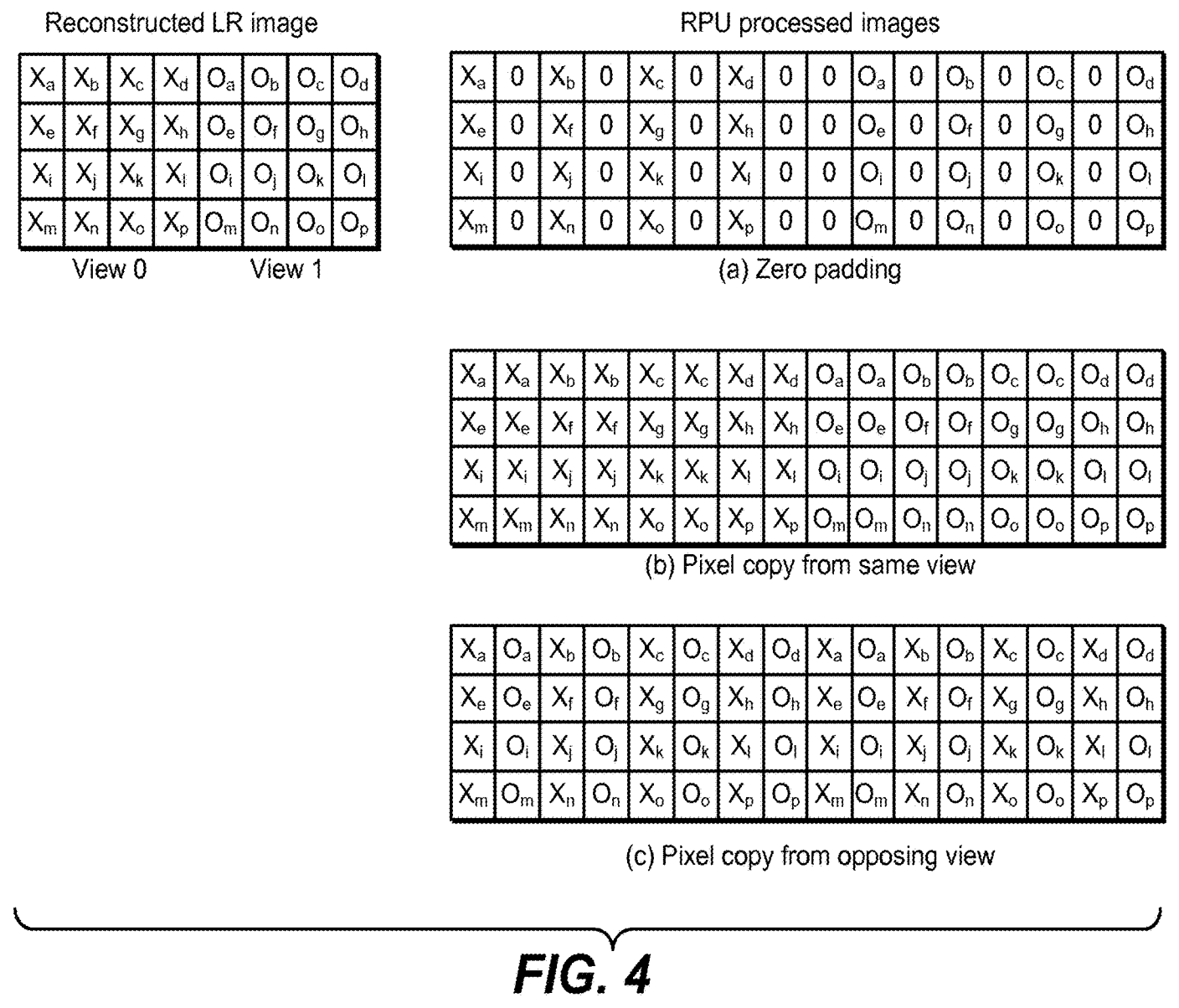

For example, one pixel replication filter would simply perform a zero-order-hold, i.e., each sample in the interpolated image will be equal to the value of a neighboring sample in the low resolution image. Another pixel replication filter may perform a cross-view copy operation, i.e., each interpolated sample in one view, will be equal to the non-interpolated colocated sample from the opposing view. Another option would be a "zero filter" that simply assigns a value of zero to the interpolated samples (See FIG. 4).

According to another embodiment of the present disclosure, a "disparity-compensated copy" scheme can also be used in the RPU. According to this embodiment, the filter may copy a non-colocated region of samples where the location of the region to be copied, which may also be a region from a different view, can be specified using a disparity vector. The disparity vector may be specified using integer or sub-pixel accuracy and may involve simple, e.g. translational motion parameter, or more complex motion models such as affine or perspective motion information among others.

The $RPU_1$ filter selection process at the encoder (310) of FIG. 3 outputs regional processing signals (322) that are provided as input data (322) to $RPU_1$ (324) at the decoder. The signaling specifies the filtering method on a per-region basis, where parameters such as the number, size, shape etc., of the regions are specified in an RPU data header. Some of the filters may be composed of fixed filter coefficients, in which case the filter coefficients need not be explicitly signaled by the RPU, or some filter modes may be explicit modes, which require that the filter parameters, such as coefficient values, number of horizontal/vertical taps, etc., are signaled explicitly.

The filters may also be specified per each color component. In addition to linear filters, non-linear filters such as edge-adaptive filters, bi-lateral filters, etc., may also be specified in the RPU, whereas more advanced prediction models, including models that specify advanced motion compensation methods such as the affine or perspective motion models could also be signaled.

The predicted images (320) from $RPU_1$ (318) of FIG. 3 are then "compared" with the original left (302) and right (304) eye views according to a set of rules, and the prediction error (326) is filtered and subsampled using filters $F_2^L$ (330) and $F_2^R$ (332)), as well as optionally incremented and quantized to fit within the appropriate pixel precision supported by the target codec. According to the embodiment shown in FIG. 3 the comparison can be a difference computation (328), to obtain a residual (326) between the $RPU_1$ predicted image (320) and the original image (302, 304). In different embodiments, a linear or non-linear function may be assumed that relates the $RPU_1$ processed images and "residual" images to the original views. Such a function may be a simple subtraction, or may involve some other linear or non-linear transform, for example, a ratio computation. Note that, although in FIG. 3, the $RPU_1$ predicted images (320) from each view are treated as separate images, in another embodiment, they may be treated as one image for the purposes of computation. The filters in $F_2$ (328, 330) and the subsampling schemes (334) may be different from those in layer 1, and may also be adaptive for each spatial and temporal region.

According to the embodiment shown in FIG. 3, the filtered and subsampled images are then re-multiplexed in the enhancement layer "3D Mux" module (336) to obtain the input to the layer 2 video encoder (338). In a further embodiment, the process of the $RPU_1$ (318) at the encoder may only provide samples from the complementary locations (such as locations that were decimated out to generate the base layer image) as output. In such an embodiment, the residual between those samples and the original views can be multiplexed and input to the layer 2 encoder (338), avoiding the need for the extra filtering (330, 332) and subsampling (334) processes at the layer 2 encoding. The layer 2 encoder (338) and decoder (340) need not be similar to the layer 1 encoder (316) and decoder (342).

The reconstructed output pictures (344) of the layer 2 encoder (338) are fed to $RPU_2$ (346). $RPU_2$ (346) at the encoder performs an optimization at a region level to determine the optimal upconversion scheme for the reconstructed pictures (344) from layer 2, such that when the output images (350) from $RPU_2$ (348) at the decoder are combined with the output images (352) from $RPU_1$ (324) at the decoder, the combined image quality is enhanced. The region-based filters of $RPU_2$ (346) may also take any one of the forms described above for $RPU_1$ (318). The associated signals (362) are transmitted to the decoder in the enhancement layer bitstream, which also contains the $RPU_1$ signaling (322) as well as the encoded bitstream (354) from layer 2. Note that, in a further embodiment, since there may be a high correlation between encoded samples in layer 1 and the samples to be encoded in layer 2, the reconstructed pictures (356) from the layer 1 encoder (316) may also be used as references in the reference picture buffer of the video encoder (338) for layer 2 allowing for some regions of layer 2 to refer to regions of layer 1 for spatial/temporal prediction. According to a further embodiment, the RPUs (318, 346) may also perform a dithering process or introduce comfort noise to the RPU processed images (320) to reduce contouring/banding artifacts, and improve the perceptual quality of the final reconstructed signal (360).

Figure 5:
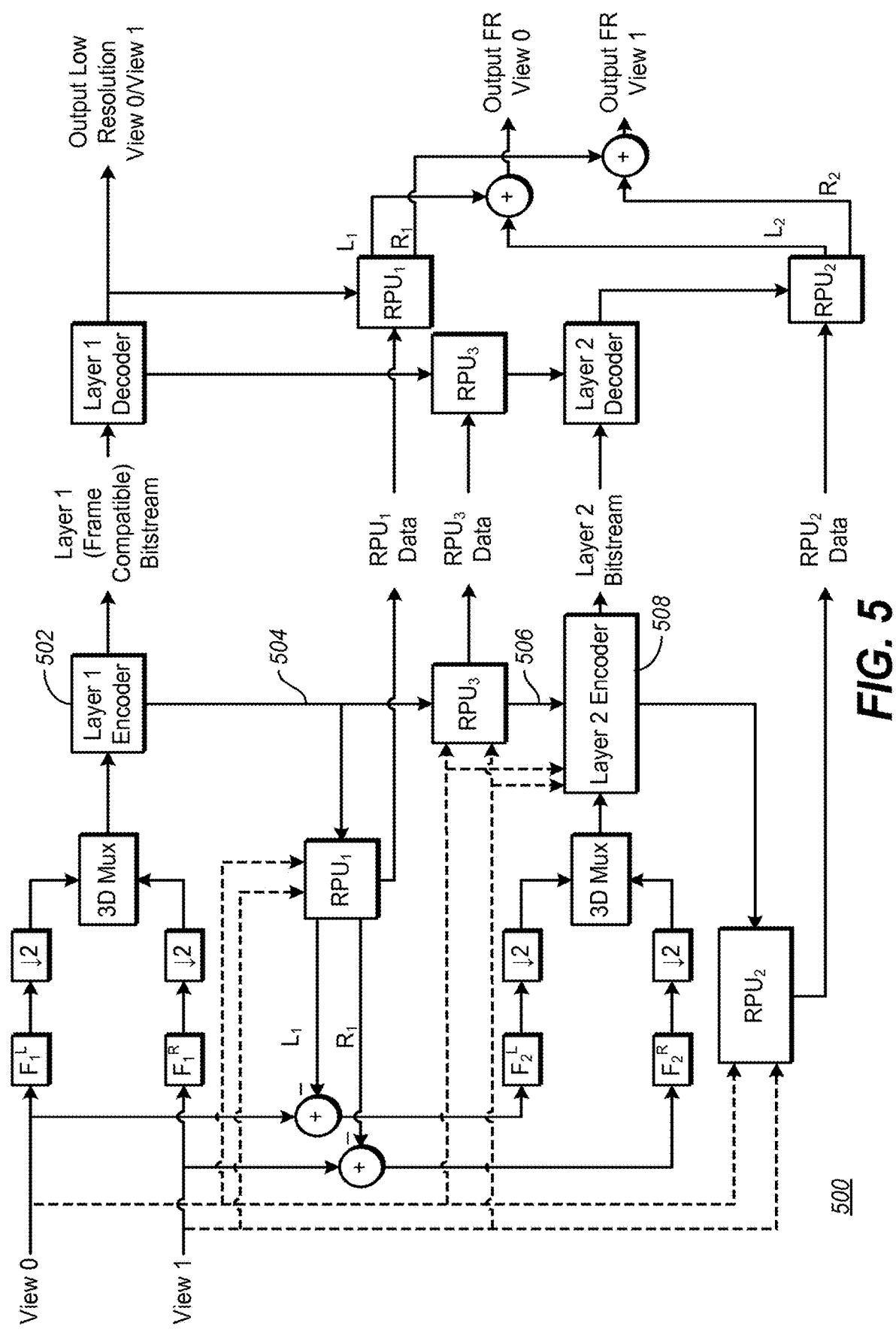
FIG. 5 depicts a block diagram of a 3D stereoscopic video delivery system that uses an additional RPU to process base layer reference pictures, according to another embodiment of the present disclosure.

FIG. 5 shows a block diagram of a 3D stereoscopic video delivery system (500), according to another embodiment of the present disclosure. In particular, according to the embodiment shown in FIG. 5, the references (504) from the previous layer may be processed using an RPU-based technique, as in Annexes A and B, prior to being input (506) to the reference picture buffer of the layer 2 encoder (508). In addition, macroblock modes, motion vectors, etc., may also be passed from the layer 1 encoder (502) to the layer 2 encoder (508). In one embodiment, layer 2 may use the layer 1 information such as reference pictures, macroblock modes, motion vectors, etc., as predictors to improve the compression efficiency of the layer 2 encoding. In a different embodiment, the images of layer 2 may be encoded independently of layer 1 allowing for a simplified decoder implementation. Note that even in that case, layer 1 information may still be used in order to initialize the encoding decisions of the layer 2 encoder thereby reducing the computational complexity of layer 2 encoding.

Figure 6A:
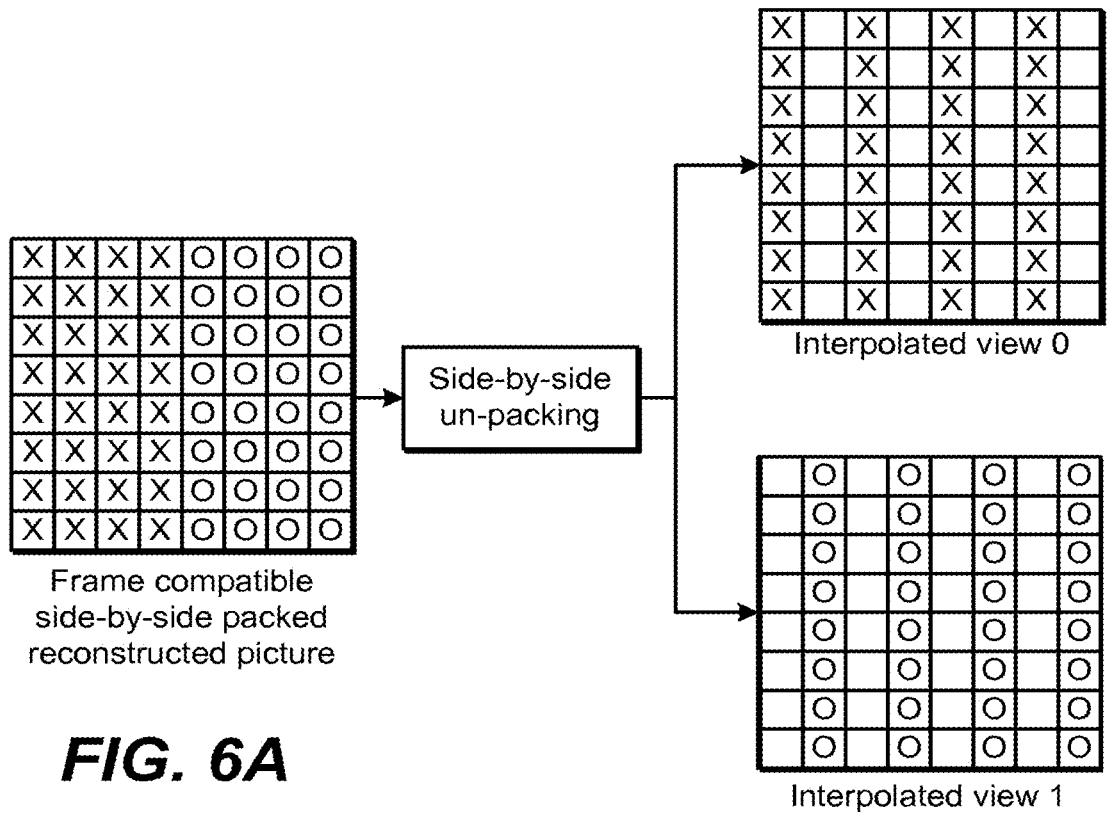
FIGS. 6A and 6B show the use of different sampling offsets for SbS unpacking in RPU, in accordance with one embodiment of the present disclosure.
Figure 6B:
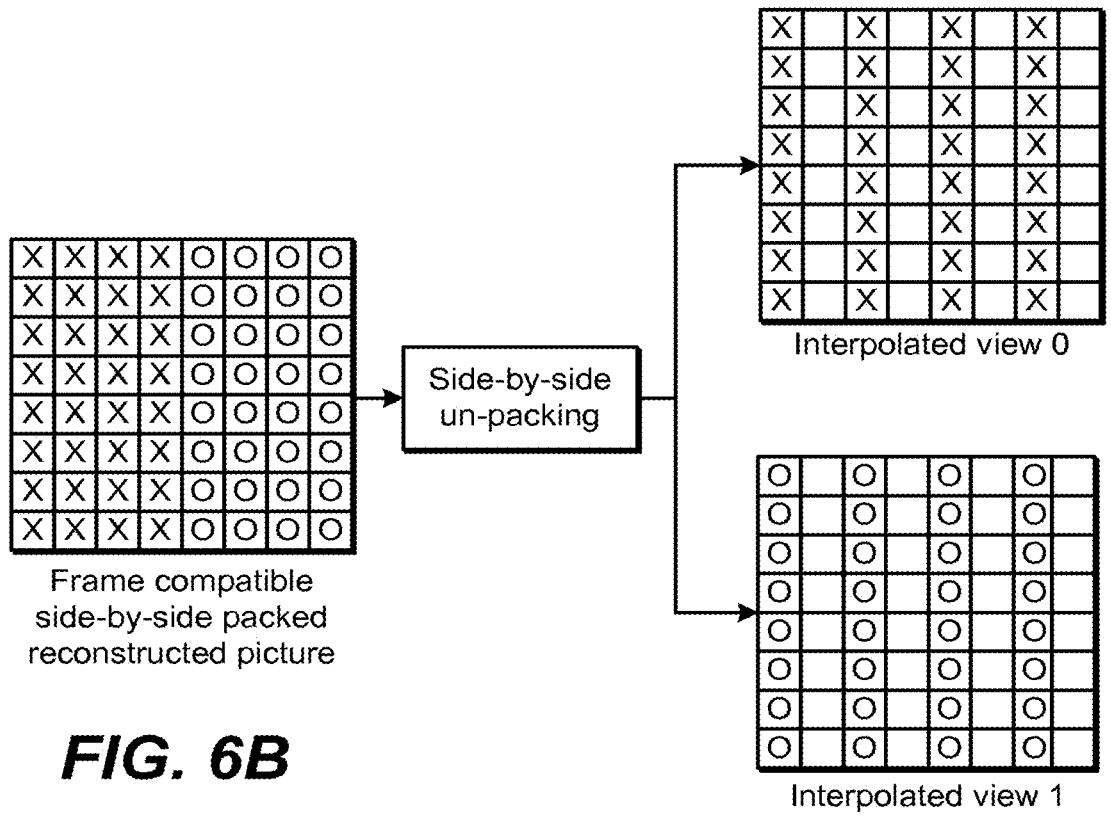

The upsampling process in the RPU may use different sampling offsets for the left and right eye, different sampling offsets depending on the layer to be encoded/decoded, for different color components, as well as different sampling offsets for each picture. Therefore, the sampling offset information will also be specified in the RPU. FIG. 6 shows two examples of sampling offsets that can be used in each view, when interpolating the low resolution reconstructed images to full resolution in a SbS scheme. Additional sampling offsets including non-integer sample offsets may also be signaled. Similar differences in sampling offset can also occur in other sampling arrangements as well.

The decoding process for the proposed system is relatively simple. The base layer (layer 1) decoder (342) of FIG. 3 decodes the layer 1 bitstream (358), which by itself, provides a frame compatible output that can be displayed in 3D using legacy decoders and existing 3D displays. The enhancement layer decoder (340) parses the enhancement layer bitstream that contains the $RPU_1$ and $RPU_2$ signaling data (322,362), as well as the layer 2 encoded bitstream (354). The decoded output of each layer is then fed to the corresponding RPU (324, 348) to obtain the interpolated reconstructed views, $L_1$, $R_1$ (352) and $L_2$, $R_2$ (350). The output full resolution (FR) left and right views (360) are obtained by combining each of the RPU processed left and right images together. In an embodiment of the present disclosure, the enhancement layer decoder performs transformations of the RPU processed left and right images before the combination process. According to further embodiments, such a transformation may be offset adjustment, precision adjustment, and scaling. For example, according to an embodiment of the present disclosure, the enhancement layer decoder subtracts an offset, like 128, from pixel values of the RPU processed left and right images in the transformation process. In another embodiment, the enhancement layer decoder scales the RPU processed left and right images by 2. The RPU or a separate unit may perform such transformations. In another embodiment, the decoder may also perform a dithering process or introduce comfort noise to the RPU processed images to reduce contouring/banding artifacts, and improve the perceptual quality of the final reconstructed signal (360). Such dither processes may also be performed by the RPUs (324, 348).

Figure 7:
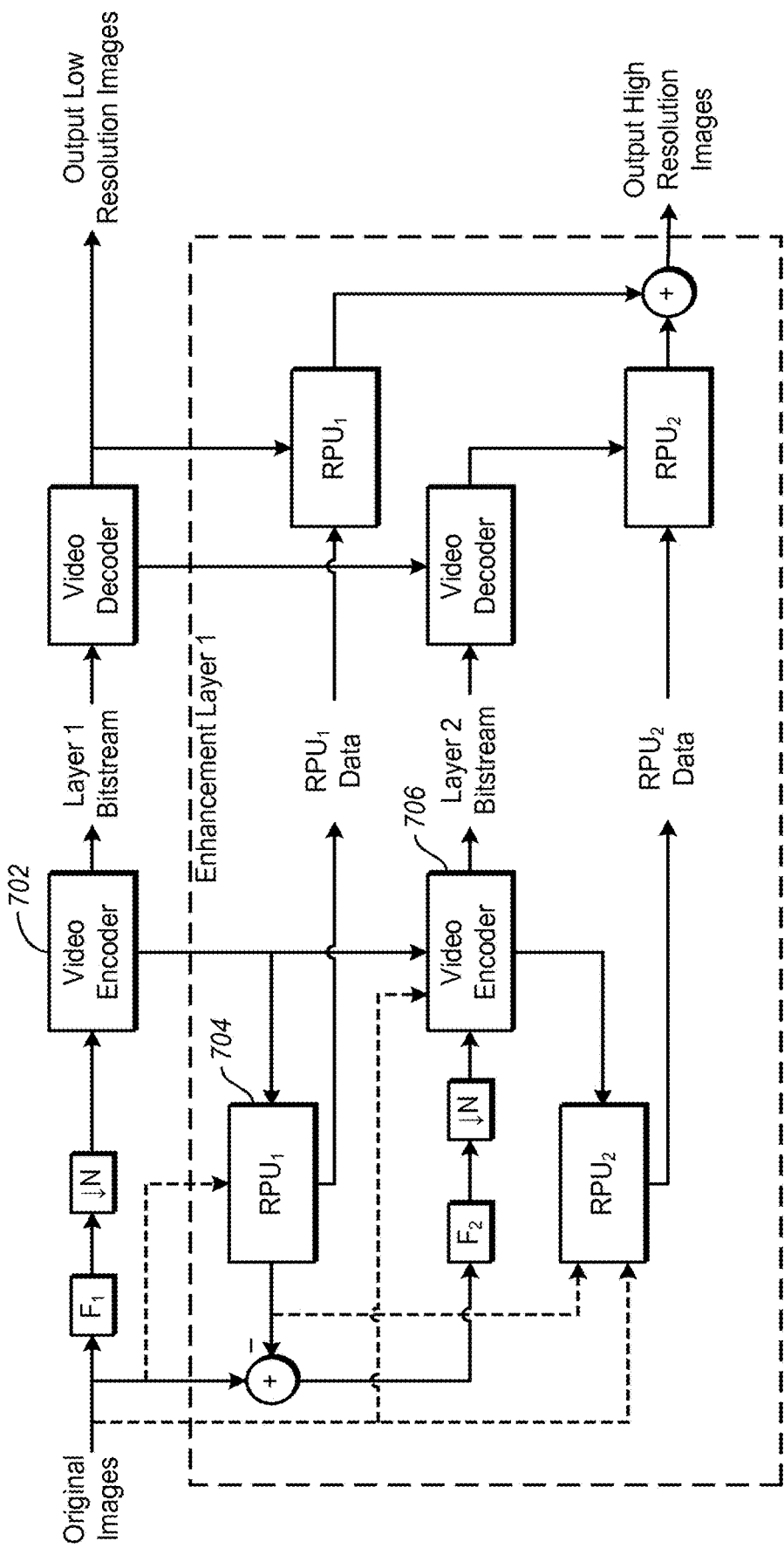
FIG. 7 depicts a block diagram of a scalable and multi-layered delivery system of non-3D images/video, according to an embodiment of the present disclosure.
Figure 8:
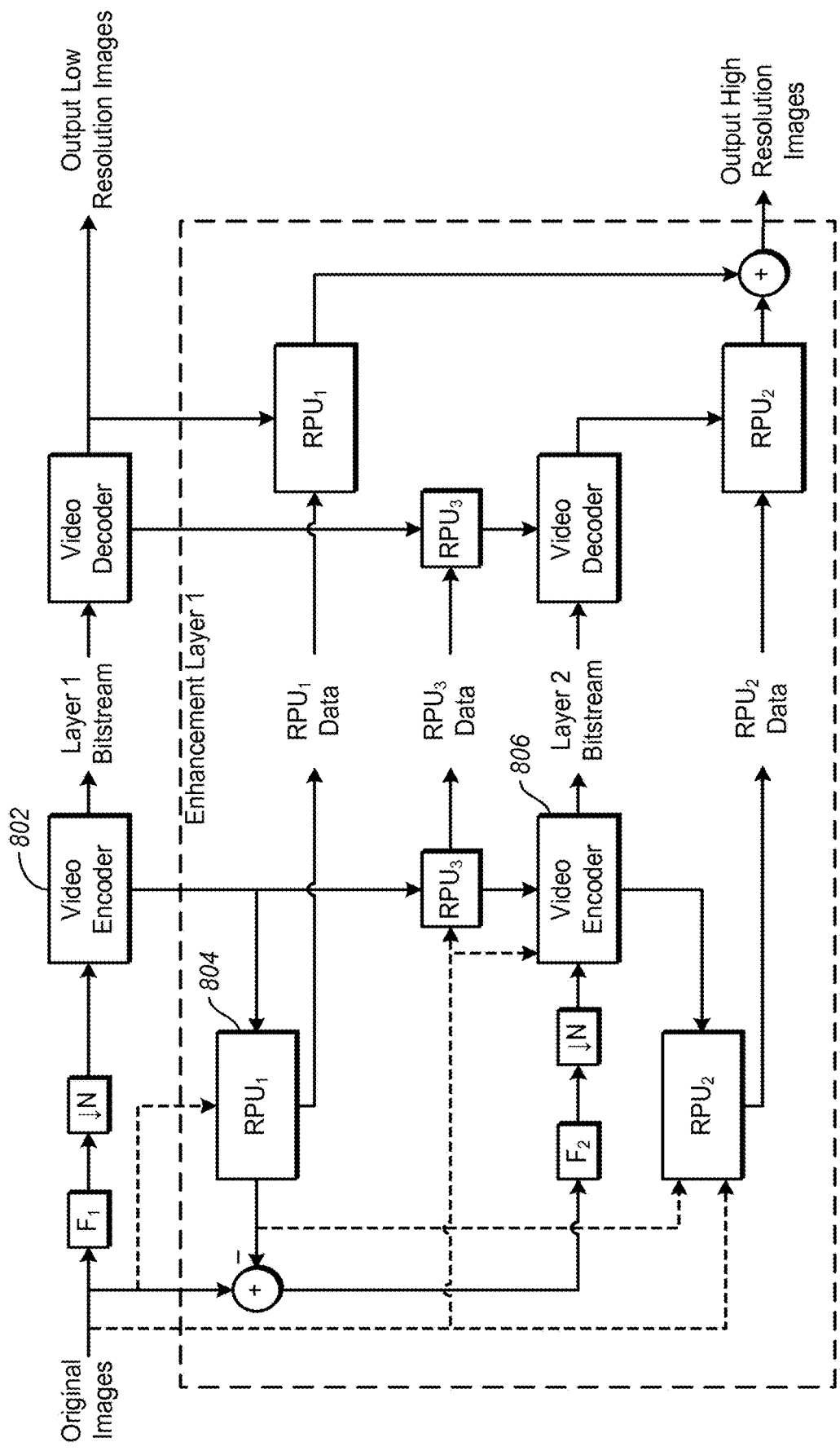
FIG. 8 depicts a block diagram of a scalable and multi-layered delivery system of non-3D images/video containing additional RPU to process a base layer picture, according to an embodiment of the present disclosure.

As shown in FIG. 7 and FIG. 8, the same concepts can also be applied for scalable and multi-layered delivery of non-3D images/video. According to the embodiments shown in FIG. 7 and FIG. 8, the original images are filtered and subsampled, to obtain low resolution images that are then encoded in the base layer encoder (702, 802). The layer 1 reconstructed images are then interpolated to full-resolution using $RPU_1$ (704, 804) and compared with the original images to obtain the "residual" images for layer 2. As mentioned above, the comparison may be a simple subtraction, or may involve some other linear or non-linear transform, such as a ratio computation. These images are filtered and subsampled, and encoded in the layer 2 encoder (706, 806). The decoding process is also similar to the previous case for 3D video, and the two layers can be combined within a post-processing unit after decoding each layer. Also, note that in this case, as well as in the case of 3D stereoscopic video coding as described previously, each layer may be encoded at a different spatial or temporal resolution, allowing for additional flexibility in the scalability provided by the system.

According to further embodiments of the present disclosure, the RPU data signaling can either be embedded in the encoded bitstream, or transmitted separately to the decoder. In an embodiment, the RPU data will be signaled along with the layer on which the RPU processing is performed. In another embodiment, the RPU data of all layers may be signaled within one RPU data packet that is embedded in the bitstream either prior to or subsequent to the layer 2 encoded data. Also note that the provision of RPU data may be optional for a given layer, and in the event that RPU data is not available, a default scheme can be used for upconversion of that layer. Similarly, the provision of an enhancement layer encoded bitstream is also optional.

The proposed architecture allows for multiple possible methods of optimally selecting the filters and filtered regions in each RPU. A number of criteria may be used separately or in conjunction in determining the optimal RPU selection. Among them are the decoded quality of the base layer bitstream, the decoded quality of the enhancement layer bitstreams, the bit rate required for the encoding of each layer including the RPU data, and the complexity of decoding and RPU processing of the data.

In one embodiment, the optimization may be performed such that the optimization of $RPU_1$ is independent of subsequent processing in the enhancement layer. In that case, in one embodiment, the optimal filter selection for $RPU_1$ may be determined such that the prediction error between the interpolated base layer images and the original left and right eye images is minimized subject to the other constraints such as bitrate and filter complexity.

In another embodiment, the filter selection for $RPU_1$ may also be combined with the filter selection for $F_1^L$ and $F_1^R$ similar to the method described in Annex C to further enhance the performance of the system. Similarly, the optimization of $RPU_2$ can be performed independent of the optimization of $RPU_1$ such that the distortion of the full resolution decoded images is minimized subject to the system constraints.

In one embodiment, however, the filters selected for $RPU_1$, as well as other encoder parameters used for the coding of layer 1 may be used in order to initialize a smaller filter search set for $RPU_2$ such that the complexity of filter selection at the encoder is reduced. In another embodiment, either $RPU_2$ or $RPU_1$ or both may be optimized using the pre-encoded images of layer 2 and layer 1 respectively in an "open-loop" scheme that can be applied prior to encoding each bitstream.

In another embodiment, the RPU filter selection of both layer 1 and layer 2 as well as the encoding of each layer may be jointly optimized in order to improve the performance of the entire system subject to the constraints. In that case, an iterative process may be used that first optimizes $RPU_1$ and then optimizes $RPU_2$ subject to the filters selected in $RPU_1$, and then re-optimizes $RPU_1$ subject to the filters selected in $RPU_2$, and so on.

Figure 9A:
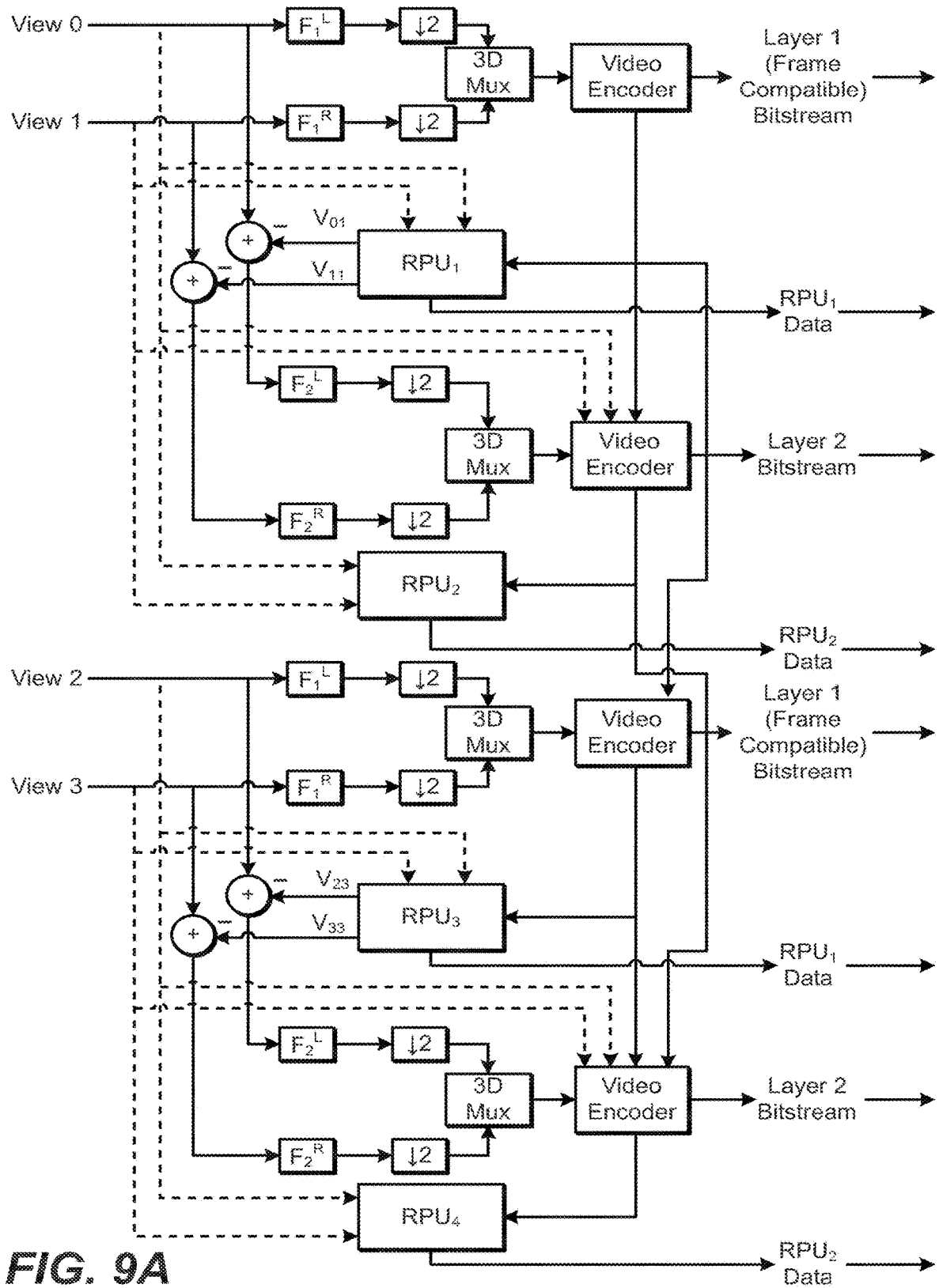
FIG. 9 (comprising FIGS. 9A and 9B) shows a multi-layered multi-view video coding architecture using more than one enhancement layer, in accordance with an embodiment of the present disclosure.

The proposed architecture can also be extended to enable the coding and transmission of additional enhancement layers, which can then be used to enable multi-view (greater than two view) applications, as well as multiple levels of scalability in single-view as well as multi-views applications. FIG. 9 illustrates one method for extending the architecture to multiple views, according to one embodiment of the present disclosure. According to that embodiment, information such as reconstructed pictures are passed from the initial two layer encoder/decoder to the corresponding layers in the subsequent two layer encoder/decoder.

In another embodiment, the reference pictures may also be further processed to take into account, for example, different sampling positions between the views of each layer as well as the disparity between the views. Note that this can also extend to the case when only one, or an odd number of additional views are used, in which case only one additional encoder/decoder will be needed.

Figure 10:
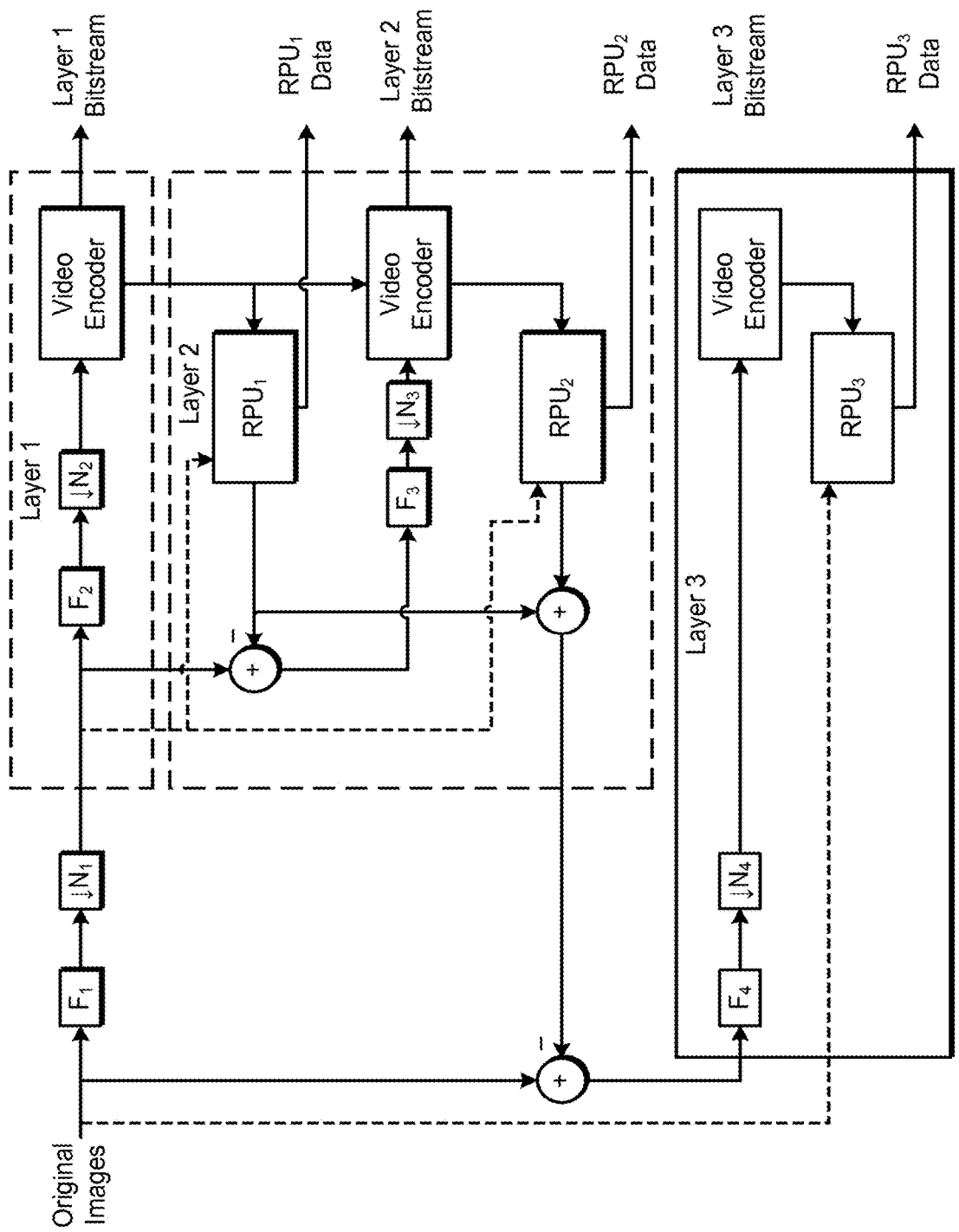
FIG. 10 depicts a frame compatible multi-layered coding architecture using more than one enhancement layer, in accordance with an embodiment of the present disclosure.

FIG. 10 illustrates a technique for extending the scheme to additional layers, in accordance with one embodiment of the present disclosure. According to the embodiment shown in FIG. 10, the first two layers may use a lower resolution encoder than the third layer which encodes the residual information after decoding the first two layers. Note that in another embodiment, the encoded resolution may remain the same in all of the layers.

Figure 11:
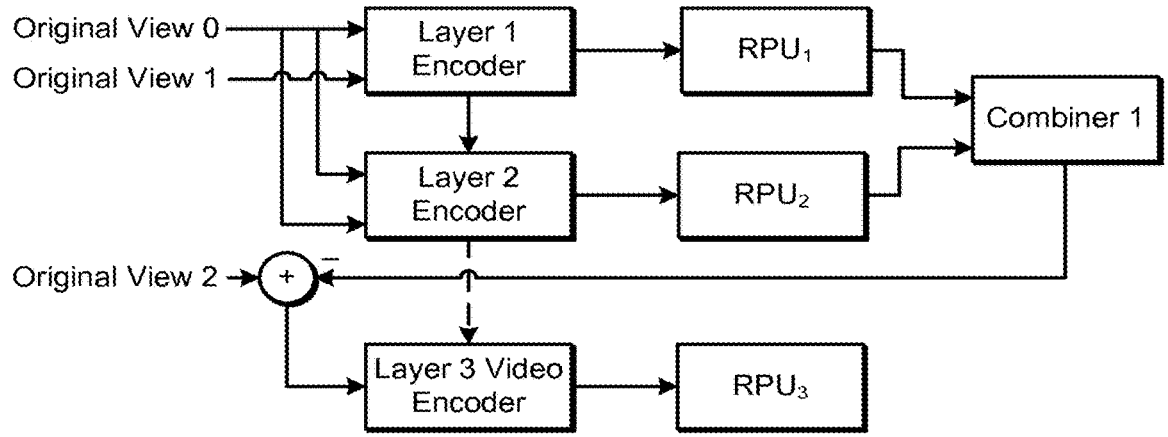
FIG. 11 depicts multihypothesis reference generation for multi-layered encoding, in accordance with an embodiment of the present disclosure.
Figure 12:
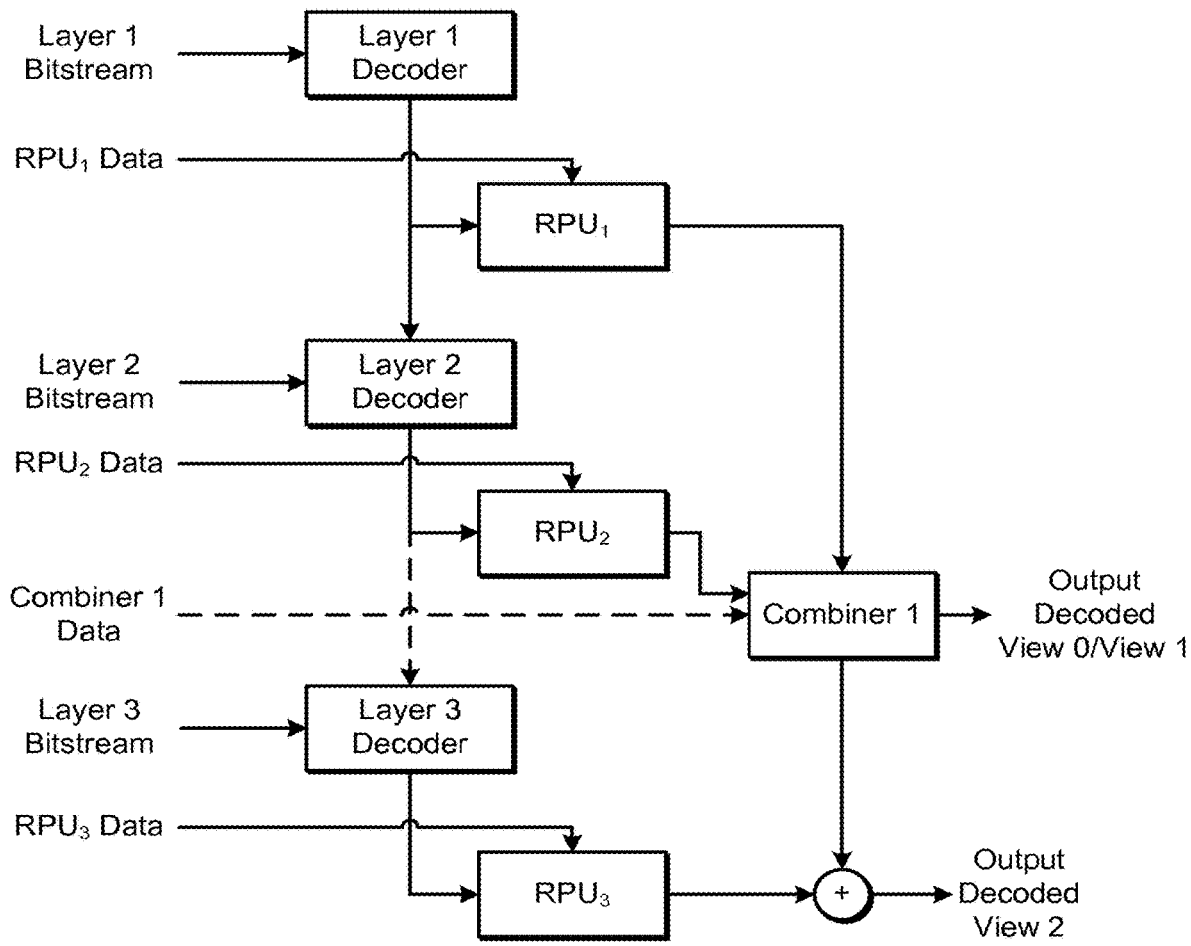
FIG. 12 depicts a multihypothesis decoder for multi-layered encoding/decoding, in accordance with an embodiment of the present disclosure.

According to another embodiment of the present disclosure, different views may be encoded and decoded using different prediction processes, or different hypothesis processes. That is, a first view is encoded and decoded using one prediction (hypothesis) process, while a second or a third view is encoded and decoded using another. A codec system using multiple predictions, or a multihypothesis process, is capable of using two or more hypothesis processes separately or jointly by combining hypothesis processes linearly or nonlinearly. FIG. 11 and FIG. 12 illustrate an embodiment for multi-layered coding that uses a multihypothesis process. According to the embodiment, the decoded RPU processed output of the layer 1 and layer 2 encoders are combined using a weighted combination to generate a prediction for the input to the layer 3 encoder. The weights may be explicitly or implicitly specified, and if explicit the combination weights will also be sent to the decoder with the layer 3 bitstream. Then, layer 3 encodes the residual information for the view to be coded relative to the prediction from layers 1 and 2.

Similarly, at the decoder, the layer 1 and layer 2 decoded outputs are combined and then the layer 3 decoded output is added to the result to obtain the final decoded view. Note that as mentioned previously, in a different embodiment, the layer 1 and layer 2 data may be combined with the layer 3 data in a different manner than subtraction/addition, such as a linear/non-linear filter, in order to generate the residual image for layer 3.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

The examples set forth above are provided to give those of ordinary skill in the art a complete disclosure and description of how to make and use the embodiments of the system and method for multi-layered image and video delivery using reference processing signals of the disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

Thus, an embodiment of the present invention may relate to one or more of the example embodiments described below.

Accordingly, the invention may be embodied in any of the forms described herein, including, but not limited to the following Enumerated Example Embodiments (EEEs) which described structure, features, and functionality of some portions of the present invention:

Thus, an embodiment of the present invention may relate to one or more of the example embodiments described below.

EEE1. A multi-layered encoding method for image and video delivery, comprising:
base layer processing at least one input image or video frame (302, 304) through a base layer, said base layer processing comprising:
  obtaining at least one first lower resolution image or video frame (316 input) by processing the at least one input image or video frame (302, 304); and
  obtaining a plurality of base layer encoded bitstream signals (358) by encoding the at least one first lower resolution image or video frame (314 input); and
enhancement layer processing the at least one image or video frame (302, 304) through one or more enhancement layers, said enhancement layer processing comprising:
  obtaining a first plurality of reference processing signals (322) and at least one first reference processed image or video frame (320) by reference processing at least one base layer signal (356) or at least one first enhancement layer signal, according to a first set of rules;
  obtaining at least one residual image or video frame (326) by processing the at least one first reference processed image or video frame (320) and the at least one input image or video frame (302, 304) according to a second set of rules;
  obtaining at least one second lower resolution image or video frame (338 input) by processing the at least one residual image or video frame (326);
  obtaining a plurality of enhancement layer encoded bitstream signals by encoding the at least one second lower resolution image or video frame (338 input); and
  obtaining a second plurality of reference processing signals (362) by reference processing at least one second enhancement layer signal (344) according to a third set of rules;

EEE2. The multi-layered encoding method according to enumerated example embodiment 1, wherein the at least one input image or video frame (302, 304) are images or video frames of a plurality of views.

EEE3. The multi-layered encoding method according to enumerated example embodiment 2, wherein the plurality of views are a first view and a second view (302, 304).

EEE4. The multi-layered encoding method according to enumerated example embodiment 3, wherein the at least one first lower resolution image or video frame (316 input) is at least one frame-compatible image or video frame obtained by base layer filtering (306), base layer subsampling (310), and base layer 3D multiplexing (314) the images or video frames (302, 304) of the first view and the second view.

EEE5. The multi-layered encoding method according to enumerated example embodiment 4, wherein the base layer subsampling is a horizontal, vertical, or quincunx subsampling.

EEE6. The multi-layered encoding method according to enumerated example embodiment 4, wherein the base layer subsampling provides unequal quality in at least one dimension for the two views.

EEE7. The multi-layered encoding method according to enumerated example embodiment 6, wherein one view is subsampled to a lower resolution than the other in at least one first dimension but to a higher resolution in at least one second dimension.

EEE8. The multi-layered encoding method according to any one of enumerated example embodiments 4-7, wherein the base layer filtering is fixed for all the images or video frames (302, 304) of the first view and the second view.

EEE9. The multi-layered encoding method according to any one of enumerated example embodiments 4-8, wherein the base layer filtering depends on at least one feature of a spatial or temporal region of the images or video frames (302, 304) of the first view and the second view.

EEE10. The multi-layered encoding method according to any one of enumerated example embodiments 4-9, wherein the base layer 3D multiplexing (314) is a side by side arrangement, an over-under arrangement, a line interleaved arrangement, a column interleaved, or a checkerboard arrangement.

EEE11. The multi-layered encoding method according to any one of enumerated example embodiments 4-10, wherein the base layer encoded bitstream signals (358) are decodable by a decoder conforming to one of the plurality of existing video coding standards and codecs.

EEE12. The multi-layered encoding method according to any one of enumerated example embodiments 4-11, wherein the encoding of the at least one frame compatible image or video frame (316 input) further comprises encoding with one of a plurality of existing color and sampling formats.

EEE13. The multi-layered encoding method according enumerated example embodiment 12, wherein the plurality of existing color and sampling formats comprises YUV 4:0:0, YUV 4:2:2, YUV 4:4:4, RGB, and XYZ.

EEE14. The multi-layered encoding method according to any one of enumerated example embodiments 11-13, wherein the base layer subsampling provides a bit-depth precision in accordance with one of the plurality of existing video coding standards and codecs or one of the plurality of existing color and sampling formats.

EEE15. The multi-layered encoding method according to any one of enumerated example embodiments 11-13, wherein the enhancement layer subsampling provides a higher bit-depth precision than the base layer subsampling.

EEE16. The multi-layered encoding method according to any one of enumerated example embodiments 4-15, wherein the at least one base layer signal (356) comprises at least one reconstructed output picture from a base layer encoder (316).

EEE17. The multi-layered encoding method according to enumerated example embodiment 16 wherein the at least one reconstructed output picture from the base layer encoder (316) comprises at least one low resolution decoded 3D image (356).

EEE18. The multi-layered encoding method according to any one of enumerated example embodiments 4-17, wherein reference processing the at least one base layer signal (356) comprises interpolating the base layer signal (356).

EEE19. The multi-layered encoding method according to any one of the enumerated example embodiments 4-18, wherein the first set of rules comprises selecting and applying at least one region-dependent filter in reference processing.

EEE20. The multi-layered encoding method according to enumerated example embodiment 19, wherein the at least one region-dependent filter is selected from a horizontal filter, a vertical filter, a 2D filter, an edge adaptive filter, a frequency based filter, and a pixel replication filter.

EEE21. The multi-layered encoding method according to enumerated example embodiment 20, wherein the pixel replication filter is a zero-order-hold filter.

EEE22. The multi-layered encoding method according to enumerated example embodiment 20, wherein the pixel replication filter is a cross-view copy filter.

EEE23. The multi-layered encoding method according to enumerated example embodiment 20, wherein the pixel replication filter is a filter with alternating zeros and nonzero values.

EEE24. The multi-layered encoding method according to any one of enumerated example embodiments 4-18, wherein the first set of rules comprises disparity-compensated copying, further comprising copying a non-collocated region of samples where the location of the region to be copied is specified by a disparity vector.

EEE25. The multi-layered encoding method according to enumerated example embodiment 24, wherein the disparity vector is specified using integer or sub-pixel accuracy.

EEE26. The multi-layered encoding method according to any one of enumerated example embodiments 4-25, further comprising providing the first plurality of reference processing signals (322) as input data for a reference processing unit (324) of a decoder.

EEE27. The multi-layered encoding method according to any one of enumerated example embodiments 4-26, wherein the first plurality of reference processing signals (322) comprises at least one region-based filtering parameter.

EEE28. The multi-layered encoding method according to enumerated example embodiment 27, wherein the at least one region-based filtering parameter comprises at least one parameter selected from number, size, shape of a region specified in a reference processing unit data header.

EEE29. The multi-layered encoding method according to enumerated example embodiment 28, wherein the at least one region-based filtering parameter comprises at least one parameter selected from filter coefficient value, number of horizontal taps, and number of vertical taps.

EEE30. The multi-layered encoding method according to any one of enumerated example embodiments 4-29, wherein the first plurality of reference processing signals (322) further comprises at least one signal associated with at least one filter per each color component.

EEE31. The multi-layered encoding method according to any one of enumerated example embodiments 4-30, wherein the first plurality of reference processing signals (322) further comprises at least one signal associated with at least one non-linear filter.

EEE32. The multi-layered encoding method according to enumerated example embodiment 31, wherein the at least one nonlinear filter comprises at least one filter selected from an edge-adaptive filter, and a bilateral filter.

EEE33. The multi-layered encoding method according to any one of enumerated example embodiments 4-32, wherein the first plurality of reference processing signals (322) further comprises at least one signal associated with at least one advanced compensation method.

EEE34. The multi-layered encoding method according to enumerated example embodiment 33, wherein the at least one advanced compensation method is an affine motion model or a perspective motion model.

EEE35. The multi-layered encoding method according to any one of enumerated example embodiments 4-34, wherein the processing of the at least one residual image or video frame (326) comprises enhancement layer filtering, enhancement layer subsampling, and enhancement layer 3D multiplexing of the at least one residual image or video frame (326).

EEE36. The multi-layered encoding method according to any one of enumerated example embodiments 4-35, wherein the processing of the at least one first reference processed image or video frame (320) and the at least one input image or video frame (302, 304), according to a second set of rules, comprises computing a difference between the at least one first reference processed image or video frame (320) and the at least one input image or video frame (302, 304).

EEE37. The multi-layered encoding method according to any one of enumerated example embodiments 4-36, wherein the processing of the at least one first reference processed image or video frame (320) and the at least one input image or video frame (302, 304), according to a second set of rules, comprises computing according to a linear or non-linear function that relates the at least one first reference processed image or video frame (320) and the at least one residual image or video frame (320) to the at least one input image or video frame (302, 304).

EEE38. The multi-layered encoding method according to any one of enumerated example embodiments 4-34, wherein the reference processing of the at least one base layer signal (356), according to a first set of rules, comprises providing samples from a plurality of complementary locations.

EEE39. The multi-layered encoding method according to enumerated example embodiment 38, wherein the processing of the at least of residual image or video frame (326) comprises multiplexing and inputting the at least of residual image or video frame (326) to an enhancement layer encoder (338).

EEE40. The multi-layered encoding method according to any one of enumerated example embodiments 4-39, wherein the encoding of the at least one first lower resolution image or video frame (314 input) is different from the encoding the at least one second lower resolution image or video frame (338 input).

EEE41. The multi-layered encoding method according to any one of enumerated example embodiments 4-40, wherein the at least one second enhancement layer signal (344) comprises at least one reconstructed output picture from an enhancement layer encoder (338).

EEE42. The multi-layered encoding method according to any one of enumerated example embodiments 4-41, wherein the reference processing of the at least second enhancement layer signal (344), according to a third set of rules, comprises optimizing at a region level to determine an optimal upconversion scheme for the at least second enhancement layer signal (344) to enhance quality of a combined image output of a decoder.

EEE43. The multi-layered encoding method according to any one of enumerated example embodiments 4-41, wherein the third set of rules comprises part or all of the first set of rules.

EEE44. The multi-layered encoding method according to any one of enumerated example embodiments 1-43, further comprising providing a plurality of enhancement layer bitstream signals to a decoder, said plurality of enhancement layer bitstream signals comprising the first plurality of reference processing signals (322), the plurality of enhancement layer encoded bitstream signals, and the second plurality of reference processing signals.

EEE45. The multi-layered encoding method according to any one of enumerated example embodiments 1-44, wherein the encoding of the at least one second lower resolution image or video frame (338 input) further comprises using as a reference at least one reconstructed image or video frame generated by the encoding of the at least one first lower resolution image or video frame (314 input).

EEE46. The multi-layered encoding method according to any one enumerated example embodiments 1-45, further comprising obtaining at least one third reference processed image or video (506) by reference processing the at least one base layer signal (356), according to fourth set of rules.

EEE47. The multi-layered encoding method according to enumerated example embodiment 46, wherein the encoding of the at least one second lower resolution image or video frame (338 input) further comprises using as a reference the at least one third reference processed image or video (506).

EEE48. The multi-layered encoding method according to enumerated example embodiments 46 or 47, wherein the encoding of the at least one second lower resolution image or video frame (338 input) further comprises selecting as at least one predictor at least one from reference picture, macroblock modes, and motion vectors generated from the encoding of the at least one first lower resolution image or video frame (314 input).

EEE49. The multi-layered encoding method according to any one of enumerated example embodiments 46-48, wherein the encoding of the at least one second lower resolution image or video frame (338 input) is independent of the encoding of the at least one first lower resolution image or video frame (314 input).

EEE50. The multi-layered encoding method according to enumerated example embodiment 49, wherein the encoding of the at least one second lower resolution image or video frame (338 input) further comprises using at least one second base layer signal to initialize the encoding.

EEE51. The multi-layered encoding method according to any one of enumerated example embodiments 3-43, wherein the reference processing of the at least one base layer signal (356) comprises using different sampling offsets for the first view and the second view.

EEE52. The multi-layered encoding method according to any one of enumerated example embodiments 3-43 and 51, wherein the reference processing of the at least one second enhancement layer signal (344) comprises using different sampling offsets for the first view and the second view.

EEE53. A multi-layered encoder for image and video delivery, comprising:
a base layer processor adapted to at least one input image or video frame, comprising a base layer encoder (314) adapted to output a plurality of base layer encoded bitstream signals (358); and
at least one enhancement layer processor adapted to at least one input image or video frame, comprising an enhancement layer encoder (336), and at least two reference processing units (RPU's) (318, 346),
wherein
the enhancement layer encoder is adapted to output a plurality of enhancement layer encoded bitstreams (354);

the first RPU (318) is adapted to process at least one output (356) from the base layer encoder (316) or at least one enhancement layer signal and to output a first plurality of reference processing data (332) and at least one first reference processed image or video frame (320) according to a first set of rules; and
the second RPU (346) is adapted to process at least one output from the enhancement layer encoder (338) and to output a second plurality of reference processing data (362) according to a second set of rules.

EEE54. The multi-layered encoder according to enumerated example embodiment 53, wherein the at least one input image or video frame (302, 304) are images or video frames of a plurality of views.

EEE55. The multi-layered encoder according to enumerated example embodiment 54, wherein the plurality of views are a first view and a second view (302, 304).

EEE56. The multi-layered encoder according to enumerated example embodiment 53, wherein the base layer processor further comprises at least two base layer filters (306, 308), at least two base layer subsamplers (310, 312), said at least two base layer filters (306, 308) adapted to filter images or video frames of the first view and the second view (302, 304) and said at least two base layer subsamplers adapted to subsample the filtered images or video frames of the first view and the second view to obtain half resolution images of the first and second views.

EEE57. The multi-layered encoder according to enumerated example embodiment 56, wherein the at least two base layer filters (306, 308) and the at least two base layer subsamplers (310, 312) are of horizontal, vertical, or quincunx subsampling schemes.

EEE58. The multi-layered encoder according to enumerated example embodiments 56, wherein the at least two base layer subsamplers (310, 312) are adapted to provide unequal quality in at least one dimensions for the two views.

EEE59. The multi-layered encoder according to enumerated example embodiment 58, wherein the at least two base layer subsamplers (310, 312) are adapted to subsample one view to a lower resolution than the other in at least one first dimension but to a higher resolution in at least one second dimension.

EEE60. The multi-layered encoder according to any one of enumerated example embodiments 56-59, wherein the at least two base layer filters (310, 312) are adapted to be fixed for all the images or video frames (302, 304) of the first view and the second view.

EEE61. The multi-layered encoder according to any one of enumerated example embodiments 56-59, wherein the at least two base layer filters (306, 308) are adapted to depend on at least one feature of a spatial or temporal region of the images or video frames (302, 304) of the first view and the second view.

EEE62. The multi-layered encoder according to any one of enumerated example embodiments 56-61, wherein the base layer processor further comprises a base layer 3D multiplexer (314), said base layer 3D multiplexer (314) adapted to 3D multiplex an image or video frame using side by side arrangement, over-under arrangement, line interleaved arrangement, column interleaved, or checkerboard arrangement.

EEE63. The multi-layered encoder according to any one of enumerated example embodiments 56-61, wherein the base layer encoded bitstream signals (358) is decodable by a decoder conforming to one of the plurality of existing video coding standards and codecs.

EEE64. The multi-layered encoder according to any one of enumerated example embodiments 56-63, wherein the base layer encoder (316) is adapted to encode at least one frame compatible image or video frame (316 input) according to one of a plurality of existing color and sampling formats.

EEE65. The multi-layered encoder according enumerated example embodiment 64, wherein the plurality of existing color and sampling formats comprises YUV 4:0:0, YUV 4:2:2, YUV 4:4:4, RGB, and XYZ.

EEE66. The multi-layered encoder according to any one of enumerated example embodiments 61-65, wherein the base layer subsampler provides a bit-depth precision in accordance with one of the plurality of existing video coding standards and codecs or one of the plurality of existing color and sampling formats.

EEE67. The multi-layered encoder according to any one of enumerated example embodiments 61-66, wherein the enhancement layer subsampler provides a higher bit-depth precision than the base layer subsampler.

EEE68. The multi-layered encoder according to any one of enumerated example embodiments 56-66, wherein the at least one output (356) of the base layer encoder (316) comprises at least one reconstructed output picture from the base layer encoder (316).

EEE69. The multi-layered encoder according to enumerated example embodiment 68 wherein the at least one reconstructed output picture from the base layer encoder (316) comprises at least one low resolution decoded 3D image (356).

EEE70. The multi-layered encoder according to any one of enumerated example embodiments 56-69, wherein the first RPU (318) is adapted to interpolate the at least one output (356) from the base layer encoder (316).

EEE71. The multi-layered encoder according to any one of the enumerated example embodiments 56-70, wherein the first set of rules comprises selecting and applying at least one region-dependent filter in the first RPU (318).

EEE72. The multi-layered encoder according to enumerated example embodiment 71, wherein the at least one region-dependent filter is at least one selected from a horizontal filter, a vertical filter, a 2D filter, an edge adaptive filter, a frequency based filter, a pixel replication filter.

EEE73. The multi-layered encoder according to enumerated example embodiment 72, wherein the pixel replication filter is a zero-order-hold filter.

EEE74. The multi-layered encoder according to enumerated example embodiment 72, wherein the pixel replication filter is a cross-view copy filter.

EEE75. The multi-layered encoder according to enumerated example embodiment 72, wherein the pixel replication filter is a filter with alternating zero and nonzero values.

EEE76. The multi-layered encoder according to any one of enumerated example embodiments 56-75, wherein the first RPU (318) uses a filter of disparity-compensated copy scheme, said filter copying a non-collocated region of samples where the location of the region to be copied is specified by a disparity vector.

EEE77. The multi-layered encoder according to enumerated example embodiment 76, wherein the disparity vector is specified using integer or sub-pixel accuracy.

EEE78. The multi-layered encoder according to any one of enumerated example embodiments 56-77, the first plurality of reference processing signals (322) are adapted to be generated from the first RPU (318)'s filter selection process and to be input data for a reference processing unit (324) of a decoder.

EEE79. The multi-layered encoder according to any one of enumerated example embodiments 56-78, wherein the first plurality of reference processing signals (322) comprises at least one region-based filtering parameter.

EEE80. The multi-layered encoder according to enumerated example embodiment 79, wherein the at least one region-based filtering parameter comprises at least one parameter selected from number, size, shape of a region specified in an RPU data header.

EEE81. The multi-layered encoder according to enumerated example embodiment 79, the at least one region-based filtering parameter comprises at least one parameter selected from filter coefficient value, number of horizontal taps, and number of vertical taps.

EEE82. The multi-layered encoder according to any one of enumerated example embodiments 56-81, wherein the first RPU (318)'s filters are specified per each color component.

EEE83. The multi-layered encoder according to any one of enumerated example embodiments 56-82, wherein at least one non-linear filter is specified in the first RPU (318).

EEE84. The multi-layered encoder according to enumerated example embodiment 83, wherein the at least one nonlinear filter comprises at least one selected filter from an edge-adaptive filter, and a bilateral filter.

EEE85. The multi-layered encoder according to any one of enumerated example embodiments 56-84, wherein the first plurality of reference processing signals (322) further comprises at least one signal associated with at least one advanced compensation method.

EEE86. The multi-layered encoder according to enumerated example embodiment 85, wherein the at least one advanced compensation method is an affine motion model or a perspective motion model.

EEE87. The multi-layered encoder according to any one of enumerated example embodiments 56-86, wherein the enhancement layer processor further comprises at least two enhancement layer filters (330, 332), at least two enhancement layer subsamplers (334), and at least one enhancement layer 3D multiplexer (336).

EEE88. The multi-layered encoder according to any one of enumerated example embodiments 56-87, wherein the enhancement layer processor further comprises at least one comparator (328), adapted to compute at least one residual image or video frame from a difference between the at least one first reference processed image or video frame (320) and the at least one input image or video frame (302, 304).

EEE89. The multi-layered encoder according to enumerated example embodiment 88, wherein the at least one comparator (328) is adapted to compute the at least one residual image or video frame according to a linear or non-linear function that relates the at least one first reference processed image or video frame (320) and the at least one residual image or video frame (320) to the at least one input image or video frame (302, 304).

EEE90. The multi-layered encoder according to any one of enumerated example embodiments 88-89, wherein the first RPU (318) is adapted to provide samples from a plurality of complementary locations.

EEE91. The multi-layered encoder according to enumerated example embodiment 90, wherein the at least one residual image or video frame is adapted to be multiplexed and input to the enhancement layer encoder (338).

EEE92. The multi-layered encoder according to any one of enumerated example embodiments 56-91, wherein the base layer encoder is different from the enhancement layer encoder.

EEE93. The multi-layered encoder according to any one of enumerated example embodiments 56-92, wherein at least one reconstructed output picture from the enhancement layer encoder (338) is adapted to be fed to the second RPU (346).

EEE94. The multi-layered encoder according to any one of enumerated example embodiments 56-93, wherein the second RPU (346) is adapted to perform an optimization at a region level to determine an optimal upconversion scheme for the reconstructed pictures (344) from the enhancement layer encoder (338) to enhance quality of a combined image output of a decoder.

EEE95. The multi-layered encoder according to any one of enumerated example embodiments 56-94, wherein the second set of rules comprises part or all of the first set of rules.

EEE96. The multi-layered encoder according to any one of enumerated example embodiments 53-95, further adapted to provide a plurality of enhancement layer bitstream signals to a decoder, said plurality of enhancement layer bitstream signals comprising the first plurality of reference processing signal (322), the plurality of enhancement layer encoded bitstream signals (354), and the second plurality of reference processing signals (362).

EEE97. The multi-layered encoder according to any one of enumerated example embodiments 53-96, wherein at least one reconstructed image (356) from the base layer encoder (316) is used as a reference for the enhancement layer encoder (338).

EEE98. The multi-layered encoder according to any one enumerated example embodiments 53-97, further comprising a third RPU adapted to process the at least one output (504) from the base layer encoder and to output at least one third reference processed image or video (506) being input to the enhancement layer encoder (508), according to a third set of rules.

EEE99. The multi-layered encoder according to enumerated example embodiment 98, wherein the enhancement layer encoder (508) is adapted to use as a reference the at least one third reference processed image or video (506).

EEE100. The multi-layered encoder according to enumerated example embodiments 98 or 99, wherein the enhancement layer encoder (508) is adapted to use at least one predictor selected from reference picture, macroblock modes, and motion vectors of the base layer encoder (502).

EEE101. The multi-layered encoder according to any one of enumerated example embodiments 98-100, wherein the enhancement layer encoder (508) is configured to be independent of the base layer encoder (502).

EEE102. The multi-layered encoder according to enumerated example embodiment 101, wherein the enhancement layer encoder (502) is adapted to use at least one signal from the base layer encoder (508) to initialize the encoding.

EEE103. The multi-layered encoder according to any one of enumerated example embodiments 56-95, wherein the first RPU is adapted to use different sampling offsets for the first view and the second view.

EEE104. The multi-layered encoder according to any one of enumerated example embodiments 56-95 and 103, wherein the second RPU is adapted to use different sampling offsets for the first view and the second view.

EEE105. The multi-layered encoder according to enumerated example embodiment 53, wherein:
the base layer processor further comprises:
a base layer filter, and
a base layer subsampler; and
the enhancement layer processor further comprises:
an enhancement layer filter,
an enhancement layer subsampler; and
an enhancement layer comparator.

EEE106. The multi-layered encoder according to enumerated example embodiment 105, wherein
the base layer filter is adapted to filter the at least one input image or video frame;
the base layer subsampler is adapted to subsample the filtered at least one input image or video frame and to output at least one low resolution image or video frame;
the base layer encoder is adapted to encode the at least one low resolution image or video frame;
the first RPU is adapted to interpolate at least one reconstructed image or video frame from the base layer encoder and to output at least one full resolution image or video frame;
the enhancement layer comparator is adapted to compute at least one residual image or video frame from the at least one reconstructed image or video frame and the at least one input image or video frame;
the enhancement layer filter is adapted to filter the at least one residual image or video frame;
the enhancement layer subsampler is adapted to subsample the filtered at least one residual image or video frame; and
the enhancement layer encoder is adapted to encode the subsampled at least one residual image or video frame.

EEE107. The multi-layered encoder according to enumerated example embodiment 106, wherein the computation performed by the enhancement layer comparator comprises a subtraction, a linear transform, or a non-linear transform.

EEE108. The multi-layered encoder according to any one of enumerated example embodiments 105-107, wherein the first and second pluralities of reference processing data are adapted to be embedded in the plurality enhancement layer encoded bitstream signals.

EEE109. The multi-layered encoder according to any one of enumerated example embodiments 105-107, wherein the first and second pluralities of reference processing data are adapted to be transferred to a decoder independently of the plurality of enhancement layer encoded bitstream signals.

EEE110. The multi-layered encoder according to any one of enumerated example embodiments 105-109, wherein the first and second pluralities of reference processing data within a same enhancement layer processor are adapted to be transferred together.

EEE111. The multi-layered encoder according to any one of enumerated example embodiments 106-110, wherein all the pluralities of reference processing data of the multi-layered encoder are adapted to be grouped in a RPU data packet that is embedded in a plurality of enhancement layer bitstream signals either before or after the plurality of enhancement layer of encoded bitstream signals.

EEE112. The multi-layered encoder according to any one of enumerated example embodiments 105-111, wherein the first set of rules and the second set of rules depend on at least one factor selected from a decoded quality of the plurality of base layer encoded bitstream signals, a decoded quality of the plurality of enhancement layer encoded bitstream signals, a bit rate required from the encoding of each layer, and a complexity of decoding and reference processing.

EEE113. The multi-layered encoder according to any one of enumerated example embodiments 105-112, wherein the first set of rules and the second set of rules are adapted to optimize filter selection of the two RPUs.

EEE114. The multi-layered encoder according to enumerated example embodiment 113, wherein optimization of the first RPU is independent of optimization of the second RPU.

EEE115. The multi-layered encoder according to enumerated example embodiment 114, wherein the first set of rules are adapted to select a set of filters for the first RPU that minimizes a prediction error between the at least one interpolated base layer image or video frame and the at least one input image or video frame.

EEE116. The multi-layered encoder according to enumerated example embodiment 113, wherein the first set of rules are adapted to select a set of filters for the first RPU and a set of filters for the base layer filter to enhance the encoder performance.

EEE117. The multi-layered encoder according to enumerated example embodiment 113, wherein the second set of rules are adapted to select a set of filters for the second RPU to minimize the distortion of full resolution decoded images.

EEE118. The multi-layered encoder according to any one of enumerated example embodiments 113-117, wherein the filters selected for the first RPU are used to initialize a smaller filter search for the second RPU.

EEE119. The multi-layered encoder according to enumerated example embodiment 113, wherein the first set of rules and the second set of rules are configured to optimize performances of the first RPU, the second RPU, the base layer encoder, and the enhancement layer encoder.

EEE120. The multi-layered encoder according to enumerated example embodiment 53, further adapted to encode multi-view images or video frames.

EEE121. The multi-layered encoder according to enumerated example embodiment 120, further adapted to process at least one reference picture by considering different sampling positions between the views of each layer and the disparity between views.

EEE122. The multi-layered encoder according to enumerated example embodiment 53, comprising a second enhancement layer processor, wherein:
the encoders of the base layer processor and the first enhancement layer processors are adapted to have a lower resolution than the second enhancement layer processor,
the second enhancement layer processor encoding the residual information after decoding outputs of the base layer processor and the first enhancement layer processor.

EEE123. A multi-layered encoder using a multihypothesis process, comprising:
a first layer encoder;
a first reference processing unit (RPU) coupled to the first layer encoder;
a second layer encoder coupled to the first layer encoder;
a second RPU coupled to the second layer encoder;
a combiner coupled to the first RPU and the second RPU;
a comparator coupled to the combiner;
a third layer encoder coupled to the second layer encoder and the comparator; and
a third RPU coupled to the third layer encoder,
wherein
the combiner is adapted to generate a prediction image as an input for the third layer encoder by a weighted combination of an output of the first RPU and an output of the second RPU;
the comparator is adapted to compute a residual image from the prediction image and an original view image; and
the third layer encoder is adapted to encode the residual image.

EEE124. A multi-layered decoding method for image and video delivery, comprising
base layer processing a plurality of base layer encoded bitstream signals (358) through a base layer, said base layer processing comprising:
obtaining at least one first low resolution image or video frame (output of 342) by decoding the plurality of base layer encoded bitstream signals (358); and
enhancement layer processing a plurality of enhancement layer bitstream signals through one or more enhancement layers, wherein
the plurality of enhancement layer bitstream signals comprises:
a plurality of enhancement layer encoded bitstream signals (354),
a first plurality of reference processing signals (322), and
a second plurality of reference processing signals (362);
said enhancement layer processing comprising:
obtaining at least one first reference processed image or video frame (352) by reference processing the first plurality of reference processing signals (322) and the at least one first low resolution image or video frame (output of 342);
obtaining at least one enhancement layer decoded signal (340 output) by decoding the plurality of enhancement layer encoded bitstream signals (354), and processing a base layer signal (the other input of 340) or an enhancement layer signal;
obtaining at least one second reference processed image or video frame (350) by reference processing the second plurality of reference processing signals (362) and the at least one enhancement layer decoded signal (340 output); and
obtaining at least one full resolution image or video frame by combining the at least one first reference processed image or video frame (352) and the at least one second reference processed image or video frame (350).

EEE125. The multi-layered decoding method according to enumerated example embodiment 124, wherein the at least one full resolution image or video frame is at least one image or video frame of a plurality of views.

EEE126. The multi-layered decoding method according to enumerated example embodiment 125, wherein the plurality of views are a first view and a second view (302, 304).

EEE127. The multi-layered decoding method according to enumerated example embodiment 126, wherein the decoding of the plurality of base layer encoded bitstream signals (358) comprises decoding with one of a plurality of existing video coding standards and codecs.

EEE128. The multi-layered decoding method according to enumerated example embodiment 126, wherein the plurality of existing video coding standards and codecs comprises MPEG-2, H.264/AVC/MPEG-4 Part 10, VC1, VP6, VP7 and VP8.

EEE129. The multi-layered decoding method according to enumerated example embodiments 127 or 128, wherein the base layer encoded bitstream signals (358) are decodable by a decoder conforming to one of the plurality of existing video coding standards and codecs.

EEE130. The multi-layered decoding method according to any one of enumerated example embodiments 125-129, wherein the decoding of the plurality of base layer encoded bitstream signals (358) further comprises decoding with one of a plurality of existing color and sampling formats.

EEE131. The multi-layered decoding method according enumerated example embodiment 130, wherein the plurality of existing color and sampling formats comprises YUV 4:0:0, YUV 4:2:2, YUV 4:4:4, RGB, and XYZ.

EEE132. The multi-layered decoding method according to any one of enumerated example embodiments 125-131, wherein the reference processing of the first plurality of reference processing signals (322) and the at least one first low resolution image or video frame (output of 342) comprises interpolating the at least one first low resolution image or video frame (output of 342).

EEE133. The multi-layered decoding method according to enumerated example embodiment 132, wherein the interpolating of the at least one first low resolution image or video frame (output of 342) is side-by-side unpacking arrangement, over-under unpacking arrangement, or checkerboard unpacking arrangement.

EEE134. The multi-layered decoding method according to any one of enumerated example embodiments 126-133, wherein the first plurality of reference processing signals (322) comprises at least one region-based filtering parameter.

EEE135. The multi-layered decoding method according to enumerated example embodiment 134, wherein the at least one region-based filtering parameter comprises at least one parameter selected from number, size, shape of a region specified in a reference processing unit data header.

EEE136. The multi-layered decoding method according to enumerated example embodiment 134, wherein the at least one region-based filtering parameter comprises at least one parameter selected from filter coefficient value, number of horizontal taps, and number of vertical taps.

EEE137. The multi-layered decoding method according to any one of enumerated example embodiments 126-136, wherein the first plurality of reference processing signals (322) further comprises at least one signal associated with at least one filter per each color component.

EEE138. The multi-layered decoding method according to any one of enumerated example embodiments 126-137, wherein the first plurality of reference processing signals (322) further comprises at least one signal associated with at least one non-linear filter.

EEE139. The multi-layered decoding method according to enumerated example embodiment 138, wherein the at least one nonlinear filter comprises at least one filter selected from an edge-adaptive filter, and a bilateral filter.

EEE140. The multi-layered decoding method according to any one of enumerated example embodiments 126-139, wherein the first plurality of reference processing signals (322) further comprises at least one signal associated with at least one advanced compensation method.

EEE141. The multi-layered decoding method according to enumerated example embodiment 140, wherein the at least one advanced compensation method is an affine motion model or a perspective motion model.

EEE142. The multi-layered decoding method according to any one enumerated example embodiments 126-141, further comprising obtaining at least one third reference processed image or video frame by reference processing an output from the decoding of the plurality of base layer encoded bitstream signals and a third plurality of reference processing signals.

EEE143. The multi-layered decoding method according to enumerated example embodiment 142, wherein the processing of the base layer signal or the enhancement layer signal further comprises using as a reference the at least one third reference processed image or video.

EEE144. The multi-layered decoding method according to any one of enumerated example embodiments 126-143, wherein the reference processing of the first plurality of reference processing signals (322) and the at least one first low resolution image or video frame (output of 342) comprises using different sampling offsets for the first view and the second view.

EEE145. The multi-layered encoding method according to any one of enumerated example embodiments 126-144, wherein the reference processing of the second plurality of reference processing signals (362) and the at least one enhancement layer decoded signal (340 output) comprises using different sampling offsets for the first view and the second view.

EEE146. A multi-layered decoder for image and video delivery, comprising
at least one base layer decoder (342) adapted to decode a plurality of base layer encoded bitstream signals (358);
at least one enhancement layer processor adapted to process a plurality of enhancement layer bitstream signals, wherein
said plurality of enhancement layer bitstream signals comprises:
a plurality of enhancement layer encoded bitstream signals (354),
a first plurality of reference processing signals (322), and
a second plurality of reference processing signals (362);
said enhancement layer processor comprising:
an enhancement layer decoder (340) adapted to parse the plurality of enhancement layer bitstream signals and to decode the plurality of enhancement encoded bitstream signals (354);
a first reference processing unit (RPU) (324) adapted to process at an output from the base layer decoder (342) and to output at least one first interpolated reconstructed image or video frame (352), according to the first plurality of reference processing signals (322);
a second RPU (348) adapted to process at an output from the enhancement layer decoder (340) and to output at least one second interpolated reconstructed image or video frame (350)), according to the second plurality of reference processing signals (322); and
at least one combiner adapted to combine the at least one first interpolated reconstructed image or video (352) and the at least one second interpolated reconstructed image or video frame (350) to obtain at least one full resolution image or video frame (360).

EEE147. The multi-layered decoder according to enumerated example embodiment 146, wherein the at least one full resolution image or video frame is at least one image or video frame of a plurality of views.

EEE148. The multi-layered decoder according to enumerated example embodiment 147, wherein the plurality of views are a first view and a second view (302, 304).

EEE149. The multi-layered decoder according to any one of enumerated example embodiments 146-148, wherein the base layer decoder (342) is adapted to decode the plurality of base layer encoded bitstream signals (358) according to one of a plurality of existing video coding standards and codecs.

EEE150. The multi-layered decoder according to enumerated example embodiment 149, wherein the plurality of existing video coding standards and codecs comprises MPEG-2, H.264/AVC/MPEG-4 Part 10, VC1, VP6, VP7 and VP8.

EEE151. The multi-layered decoder according to any one of enumerated example embodiments 146-150, wherein the base layer decoder (342) is adapted to decode the plurality of base layer encoded bitstream signals (358) according to one of a plurality of existing color and sampling formats.

EEE152. The multi-layered decoder according enumerated example embodiment 151, wherein the plurality of existing color and sampling formats comprises YUV 4:0:0, YUV 4:2:2, YUV 4:4:4, RGB, and XYZ.

EEE153. The multi-layered decoder according to any one of enumerated example embodiments 146-152, wherein the first RPU (324) is adapted to interpolate the at least one output from the base layer decoder (342).

EEE154. The multi-layered decoder according to any one of the enumerated example embodiments 146-153, wherein the first RPU (324) further comprises at least one region-dependent filter.

EEE155. The multi-layered decoder according to enumerated example embodiment 154, wherein the at least one region-dependent filter is at least one selected from a horizontal filter, a vertical filter, a 2D filter, an edge adaptive filter, a frequency based filter, a pixel replication filter.

EEE156. The multi-layered decoder according to enumerated example embodiment 155, wherein the pixel replication filter is a zero-order-hold filter.

EEE157. The multi-layered decoder according to enumerated example embodiment 155, wherein the pixel replication filter is a cross-view copy filter.

EEE158. The multi-layered decoder according to enumerated example embodiment 155, wherein the pixel replication filter is a filter with alternating zero and nonzero values.

EEE159. The multi-layered decoder according to any one of enumerated example embodiments 146-158, wherein the first RPU (342) uses a filter of disparity-compensated copy scheme, said filter copying a non-collocated region of samples where the location of the region to be copied is specified by a disparity vector.

EEE160. The multi-layered decoder according to enumerated example embodiment 159, wherein the disparity vector is specified using integer or sub-pixel accuracy.

EEE161. The multi-layered decoder according to any one of enumerated example embodiments 146-160, wherein the first plurality of reference processing signals (322) comprises at least one region-based filtering parameter.

EEE162. The multi-layered decoder according to enumerated example embodiment 161, wherein the at least one region-based filtering parameter comprises at least one parameter selected from number, size, shape of a region specified in an RPU data header.

EEE163. The multi-layered decoder according to enumerated example embodiment 161, the at least one region-based filtering parameter comprises at least one parameter selected from filter coefficient value, number of horizontal taps, and number of vertical taps.

EEE164. The multi-layered decoder according to any one of enumerated example embodiments 146-163, wherein the first RPU (342)'s filters are specified per each color component.

EEE165. The multi-layered decoder according to any one of enumerated example embodiments 146-164, wherein at least one non-linear filter is specified in the first RPU (342).

EEE166. The multi-layered decoder according to enumerated example embodiment 165, wherein the at least one nonlinear filter comprises at least one selected filter from an edge-adaptive filter, and a bilateral filter.

EEE167. The multi-layered decoder according to any one of enumerated example embodiments 146-166, wherein the first plurality of reference processing signals (322) further comprises at least one signal associated with at least one advanced compensation method.

EEE168. The multi-layered decoder according to enumerated example embodiment 167, wherein the at least one advanced compensation method is an affine motion model or a perspective motion model.

EEE169. The multi-layered decoder according to any one of enumerated example embodiments 146-168, wherein the base layer decoder is different from the enhancement layer decoder.

EEE170. The multi-layered decoder according to any one of enumerated example embodiments 146-169, wherein at least one reconstructed output picture from the enhancement layer decoder (340) is adapted to be fed to the second RPU (348).

EEE171. The multi-layered decoder according to any one of enumerated example embodiments 146-170, wherein at least one reconstructed image from the base layer encoder (342) is used as a reference for the enhancement layer decoder (340).

EEE172. The multi-layered decoder according to any one enumerated example embodiments 146-170, further comprising a third RPU adapted to process the output from the base layer decoder (342) and to output at least one third reference processed image or video being input to the enhancement layer decoder (340), according to a third plurality of reference processing signals.

EEE173. The multi-layered decoder according to enumerated example embodiment 172, wherein the enhancement layer decoder is adapted to use as a reference the at least one third reference processed image or video.

EEE174. The multi-layered decoder according to enumerated example embodiments 172 or 173, wherein the enhancement layer decoder is adapted to use at least one predictor selected from reference picture, macroblock modes, and motion vectors of the base layer decoder.

EEE175. The multi-layered decoder according to any one of enumerated example embodiments 172-174, wherein the enhancement layer decoder is configured to be independent of the base layer decoder.

EEE176. The multi-layered decoder according to enumerated example embodiment 175, wherein the enhancement layer decoder is adapted to use at least one signal from the base layer decoder to initialize the decoding.

EEE177. The multi-layered decoder according to any one of enumerated example embodiments 148-176, wherein the first RPU is adapted to use different sampling offsets for the first view and the second view.

EEE178. The multi-layered decoder according to any one of enumerated example embodiments 148-177, wherein the second RPU is adapted to use different sampling offsets for the first view and the second view.

EEE179. The multi-layered decoder according to enumerated example embodiment 146, wherein a combination process performed by the enhancement layer combiner comprises a subtraction, a linear transform, or a non-linear transform.

EEE180. The multi-layered decoder according to enumerated example embodiment 146, further adapted to encode multi-view images or video frames.

EEE181. The multi-layered decoder according to enumerated example embodiment 180, further adapted to process at least one reference picture by considering different sampling positions between the views of each layer and the disparity between views.

EEE182. A multi-layered decoder using a multihypothesis process, comprising:
 a first layer decoder;
 a first reference processing unit (RPU) coupled to the first layer decoder;
 a second layer decoder coupled to the first layer decoder;
 a second RPU coupled to the second layer decoder;
 a combiner coupled to the first RPU and the second RPU;
 a third layer encoder coupled to the second layer encoder;
 a third RPU coupled to the third layer encoder, and an adder coupled to the combiner and the third RPU.

EEE183. A method for image or video delivery, comprising:
 an encoding process according to the method recited in one or more of enumerated example embodiments 1-52; and
 a decoding process according to the method recited in one or more of enumerated example embodiments 124-145.

EEE184. A codec system for image or video delivery, comprising:
 the multi-layered encoder according to any one of enumerated example embodiments 53-123; and
 the multi-layered decoder according to any one of enumerated example embodiments 146-181.

EEE185. A codec system using a multihypothesis process, comprising:
 the multi-layered encoder according to enumerated example embodiment 117; and
 the multi-layered decoder according to enumerated example embodiment 182.

What is claimed is:

1. A decoding method for multi-layered frame-compatible video delivery with one or more processors, the method comprising:
 receiving a coded bitstream comprising a coded base layer, a coded first enhancement layer, and a coded second enhancement layer;
 base layer processing of the coded base layer using a base layer processor to generate at least one frame-compatible base layer decoded image, wherein the at least one frame-compatible base layer decoded image comprises a base layer image of a first view in a first spatial resolution and a base layer image of a second view in the first spatial resolution multiplexed together in a multiplexing pattern;
 a first enhancement layer processing of the coded first layer bitstream to generate a first decoded residual image for the first view at a second spatial resolution higher than the first spatial resolution;
 a second enhancement layer processing of the coded second layer bitstream to generate a second decoded residual image for the second view at the second spatial resolution;
 a first reference processing to generate a first reference image at the second spatial resolution based on a decoded base layer image of the first view and a first filtering method specified in the coded bitstream, wherein the first reference processing includes a first sampling offset information used for the first view;
 a second reference processing to generate a second reference image at the second spatial resolution based on a decoded base layer image of the second view and a second filtering method specified in the coded bitstream, wherein the second reference processing includes a second sampling offset information used for the second view, said second sampling offset information being independent from the first sampling offset information;
 performing disparity compensation using the first reference image and the first decoded residual image to generate an output first view at the second spatial resolution; and
 performing disparity compensation using the second reference image and the second decoded residual image to generate an output second view at the second spatial resolution.

2. The method of claim 1, wherein the multiplexing pattern is a checkerboard multiplexing pattern.

3. The method of claim 1, wherein the multiplexing pattern comprises one of a side-by-side, over-under, line-interleaved, or column-interleaved multiplexing pattern.

4. The method of claim 1, wherein the first and second filtering methods comprise up-sampling filtering methods.

5. The method of claim 1, wherein the first and second filtering methods are the same.

6. The method of claim 1, wherein the first and second filtering methods are different.

7. The method of claim 1, wherein the first filtering method is specified on a per-region basis.

* * * * *